US012356137B1

(12) United States Patent
Cloud et al.

(10) Patent No.: US 12,356,137 B1
(45) **Date of Patent: *Jul. 8, 2025**

(54) PHANTOM POWERED FET CIRCUIT FOR AUDIO APPLICATION

(71) Applicant: Cloud Microphones, LLC., Tucson, AZ (US)

(72) Inventors: Rodger Cloud, Tucson, AZ (US); Stephen Sank, Tucson, AZ (US)

(73) Assignee: Cloud Microphones, LLC., Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/537,372

(22) Filed: Dec. 12, 2023

Related U.S. Application Data

(60) Continuation of application No. 17/533,117, filed on Nov. 23, 2021, now Pat. No. 11,856,358, which is a continuation of application No. 16/929,458, filed on Jul. 15, 2020, now Pat. No. 11,190,869, which is a continuation of application No. 16/438,262, filed on Jun. 11, 2019, now Pat. No. 10,721,552, which is a continuation of application No. 15/796,725, filed on Oct. 27, 2017, now Pat. No. 10,356,507, which is a continuation of application No. 14/887,082, filed on Oct. 19, 2015, now Pat. No. 9,888,315, which is a continuation of application No. 13/854,839, filed on Apr. 1, 2013, now Pat. No. 9,167,327, which is a division of application No. 12/901,522, filed on Oct. 9, 2010, now Pat. No. 8,433,090.

(60) Provisional application No. 61/250,001, filed on Oct. 9, 2009.

(51) Int. Cl.

| | |
|---|---|
| ***H04R 1/22*** | (2006.01) |
| ***H04R 1/08*** | (2006.01) |
| ***H04R 1/28*** | (2006.01) |
| ***H04R 3/00*** | (2006.01) |
| ***H04R 9/02*** | (2006.01) |
| ***H04R 9/04*** | (2006.01) |

(52) U.S. Cl.

CPC ............ *H04R 1/222* (2013.01); *H04R 1/083* (2013.01); *H04R 3/00* (2013.01); *H04R 9/025* (2013.01); *H04R 9/048* (2013.01); *H04R 1/08* (2013.01); *H04R 1/2876* (2013.01)

(58) Field of Classification Search

None

See application file for complete search history.

*Primary Examiner* — Qin Zhu

(74) *Attorney, Agent, or Firm* — Invent Capture, LLC.; Samuel S. Cho

(57) ABSTRACT

A novel phantom-powered FET (field effect transistor) circuit for audio application is disclosed. In one embodiment of the invention, a novel phantom-powered FET preamplifier gain circuit can minimize undesirable sound distortions and reduce the cost of producing a conventional preamplifier gain circuit. Moreover, in one embodiment of the invention, one or more novel rounded-edge magnets may be placed close to a ribbon of a ribbon microphone, wherein the one or more novel rounded-edge magnets reduce or minimize reflected sound wave interferences with the vibration of the ribbon during an operation of the ribbon microphone. Furthermore, in one embodiment of the invention, a novel backwave chamber operatively connected to a backside of the ribbon can minimize acoustic pressure, anomalies in frequency responses, and undesirable phase cancellation and doubling effects.

13 Claims, 26 Drawing Sheets

FIG. 1A
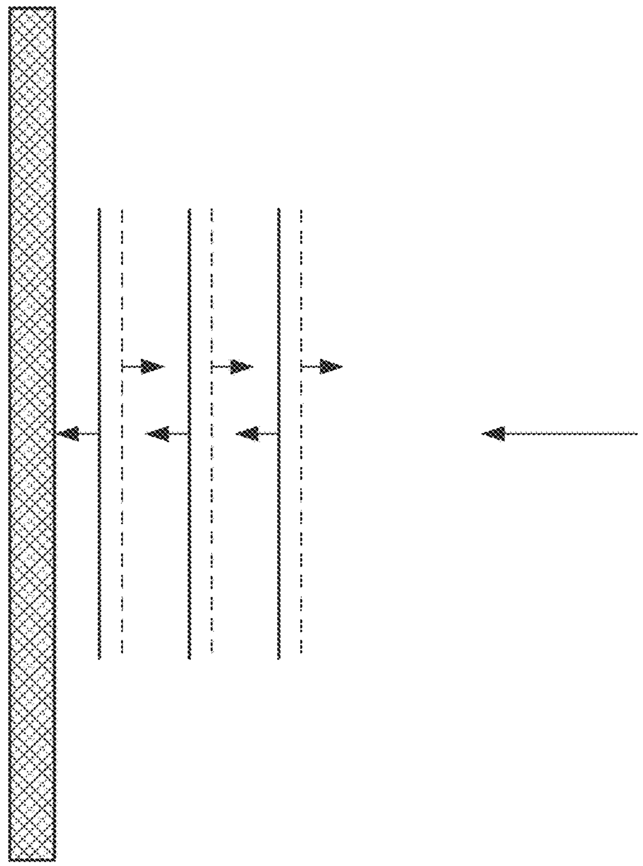
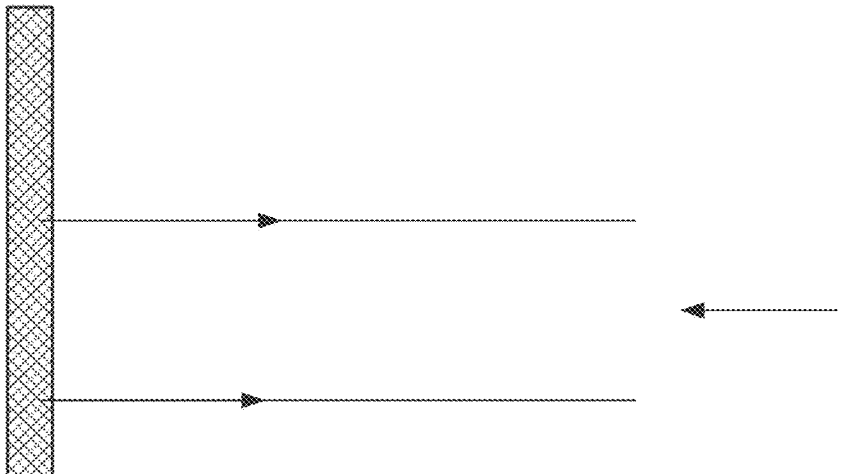
FIG. 1B

FIG. 1C
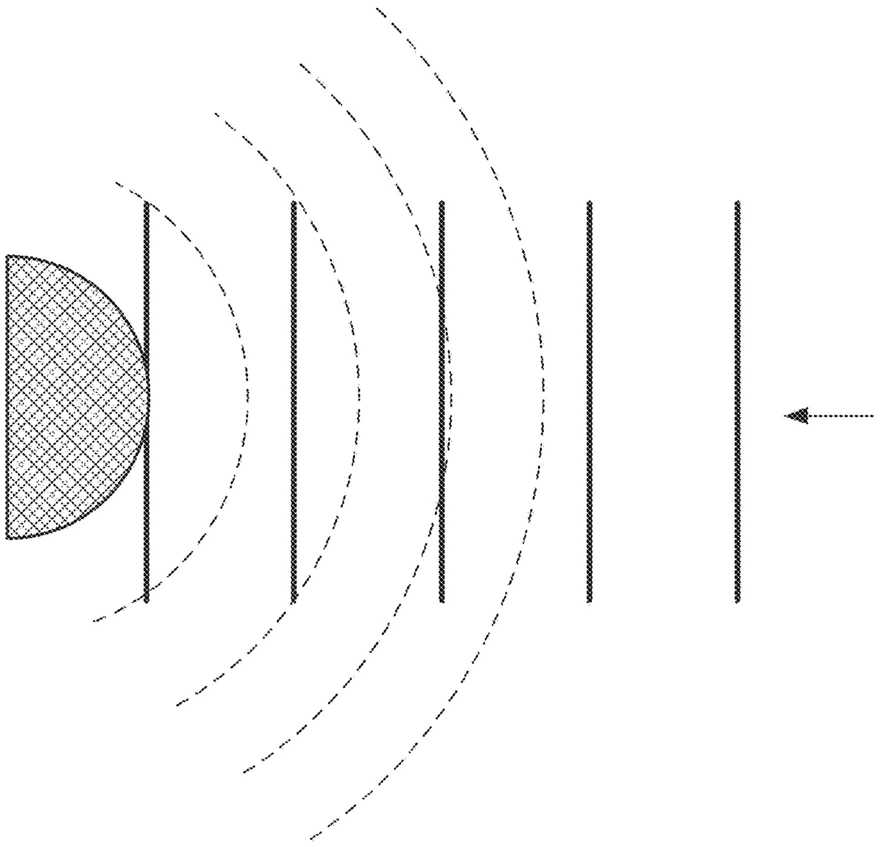
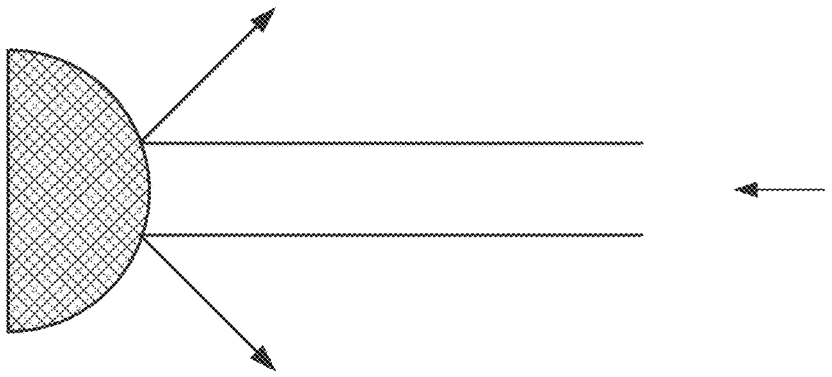
FIG. 1D

EXAMPLE COMPONENT VALUES:
Q1 + Q2 = 2SK117
Q3 + Q4 = 2SK170
R1 + R2 = 680 KΩ
R3 + R4 = 22Ω
R5 = 47Ω

EXAMPLE COMPONENT VALUES:
Q1 + Q2 = 2SK117
Q3 + Q4 = 2SK170
R1 + R2 = 680 KΩ
R3 + R4 = 22Ω
R5 = 47Ω
R6 = 5KΩ
C1 =100pf

NOTE: R6 & C1 ARE OPTIONAL.

EXAMPLE COMPONENT VALUES:

Q1 + Q2 = 2SK117 OR 2SK170
Q3 + Q4 = 2SK117 OR 2SK170
R1 + R2 = 33 KΩ
R3 + R4 = 22 Ω
R5 = 39 Ω
R6 = 1 KΩ
R7 = 5 KΩ POTENTIOMETER
C1 = 100 pf
C2 = 0.47 uf
S1 = SWITCH (BYPASS)

DELETE R7 FOR FIXED HIGH PASS

EXAMPLE COMPONENT VALUES:

Q1 + Q2 = 2SK117 OR 2SK170
Q3 + Q4 = 2SK117 OR 2SK170
Q5 + Q6 = 2SK117 OR 2SK170
Q7 + Q8 = 2SK117 OR 2SK170
R1 + R2 = 22 Ω
R3 = 39 Ω
R4 = 1 KΩ
C1 = 100 pf

PHANTOM POWERED FET CIRCUIT FOR AUDIO APPLICATION

BACKGROUND OF THE INVENTION

In the first half of the $20^{th}$ century, ribbon microphones once dominated commercial broadcasting and recording industries as a preferred high-end microphone technology. First developed by Dr. Harry F. Olson of RCA corporation in the late 1920's, Ribbon microphones widely commercialized in the 1930's exhibited superior frequency responses and higher-fidelity output signals compared to many condenser microphones of the time.

A ribbon microphone typically uses a thin piece of metal immersed in magnetic field generated by surrounding magnets. The thin piece of metal is generally called a "ribbon" and is often corrugated to achieve wider frequency response and fidelity. Ribbon microphones became vastly popular and became a primary broadcasting and recording microphone until mid-1960's.

However, the classic ribbon microphone architecture was susceptible to significant disadvantages. First, a typical ribbon microphone contained a fragile ultra-thin ribbon, typically made of corrugated aluminum, which could break easily if the ribbon microphone casing was subject to a gust of air through its microphone windscreen. Second, most ribbon microphones could not produce as high output signal level as condenser or dynamic microphones. The lack of high output signal level for ribbon microphones usually required careful pre-amplification matching and tuning, which was cumbersome and contributed to reduced ruggedness and reliability compared to condenser and dynamic microphones.

By the mid-1960's, dynamic moving-coil microphones (i.e. coil wire on a diaphragm suspended over a magnetic field) and condenser microphones (i.e. capacitor microphones) evolved technologically for higher sensitivity and signal-to-noise ratio (SNR) to compete effectively against ribbon microphones. For example, improved condenser microphones exhibited substantially higher output signal level than ribbon microphones, thereby simplifying pre-amplification process and improving reliability of recording or broadcasting equipment.

Although a typical condenser microphone had the tendency of exaggerating upper frequency ranges whenever inherent harmonic resonances occurred in a diaphragm of the microphone, the exaggerated upper frequency was actually preferred by some while recording industry continued using analog tape mediums for audio recording. Most analog tapes suffered generational signal losses and could not accurately capture high-frequency ranges, which made the use of condenser microphone-based recording equipment more acceptable. Similarly, although dynamic moving-coil microphones fundamentally possessed higher resistivity to sound waves than ribbon microphones, improved dynamic moving-coil microphones provided ways to compensate for a relatively low high-frequency response. Therefore, by the mid-1960's, most ribbon microphones were rapidly replaced by more portable, rugged, and user-friendly condenser and dynamic moving-coil microphones. By the end of that decade, ribbon microphones were widely considered obsolete.

However, despite several drawbacks as mentioned above, ribbon microphones possess fundamental advantages as recording and broadcasting industry become fully adjusted to the digital era. As Compact Discs and solid-state non-volatile memory (e.g. NAND flash memory) became recording media of choice for highly digitized recording and broadcasting equipment, the high-frequency exaggeration and distortion provided by condenser microphones were no longer desirable. Many audio engineers and music lovers began to favor more natural and linear reproduction of sound, which meant that ribbon microphone's fundamentally higher fidelity in higher frequencies received attention once again. Ribbon microphones also provide a generally richer and fuller sound reproduction compared to condenser and dynamic moving-coil microphones with digital audio recording and broadcasting equipment. In recent years, there has been a resurgence of demand for retrofitted ribbon microphones of yore and a need for newly-designed ribbon microphones, especially in the high-end audio industry.

For a newly-designed microphone, it is desirable to reduce signal distortions, provide a high-fidelity sound-capturing design element for a magnet motor assembly surrounding a ribbon, and simplify circuitry to reduce cost of production. Furthermore, a novel phantom-powered FET preamplifier gain circuit that can minimize undesirable sound distortions and reduce the cost of producing a conventional preamplifier gain circuit in audio applications is also highly desirable.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a phantom-powered transistor preamplifier gain circuit for a microphone or a musical instrument is disclosed. This phantom-powered transistor preamplifier gain circuit comprises: a first transistor and a second transistor with their gate terminals coupled to a first signal input terminal, which is configured to receive at least one sound source signal, and wherein the first transistor and the second transistor are connected to each other in parallel and further coupled to a first signal output terminal powered by an external phantom power supply; and a third transistor and a fourth transistor with their gate terminals coupled to a second signal input terminal, which is configured to receive at least one sound source signal, and wherein the third transistor and the fourth transistor are connected to each other in parallel and further coupled to a second signal output terminal powered by the external phantom power supply.

Yet in another embodiment of the invention, a rounded magnet motor assembly as part of a ribbon microphone is disclosed. This rounded magnet motor assembly comprises a thin corrugated ribbon; a first bar magnet with a first rounded-edge, or a first cylindrical magnetized pole piece facing a first side of the thin corrugated ribbon; and a second bar magnet with a second rounded-edge, or a second cylindrical magnetized pole piece facing a second side of the thin corrugated ribbon, wherein the first rounded-edge, the second rounded-edge, the first cylindrical magnetized pole, or the second cylindrical magnetized pole is convex-shaped to diverge reflected sound waves from the first bar magnet, the second bar magnet, the first cylindrical magnetized pole, or the second cylindrical magnetized pole to enable the thin corrugated ribbon to capture sound emanating from a source of sound with only minimal interferences from the reflected sound waves.

Furthermore, in another embodiment of the invention, a backwave chamber for improved and flatter frequency responses for a ribbon microphone is disclosed. This backwave chamber comprises a primary chamber facing a backside of a thin corrugated ribbon through a first opening; and a secondary chamber operatively connected to the primary chamber through a second opening, wherein the primary chamber and the secondary chamber reduce acoustic pressure, sound reflections on the backside of the thin corrugated ribbon, undesirable phase cancellation, and doubling effects for the improved or flatter frequency responses.

BRIEF DESCRIPTION OF DRAWINGS

Implementations of the invention will become more apparent from the detailed description set forth below when taken in conjunction with the drawings, in which like elements bear like reference numerals.

FIG. 1A shows a diagram of the reflection of sound waves from a rigid, plane surface.

FIG. 1B shows a ray diagram of FIG. 1A.

FIG. 1C shows a diagram of the reflection of sound waves from a convex surface.

FIG. 1D shows a ray diagram of FIG. 1C.

DETAILED DESCRIPTION

Figure 2A:
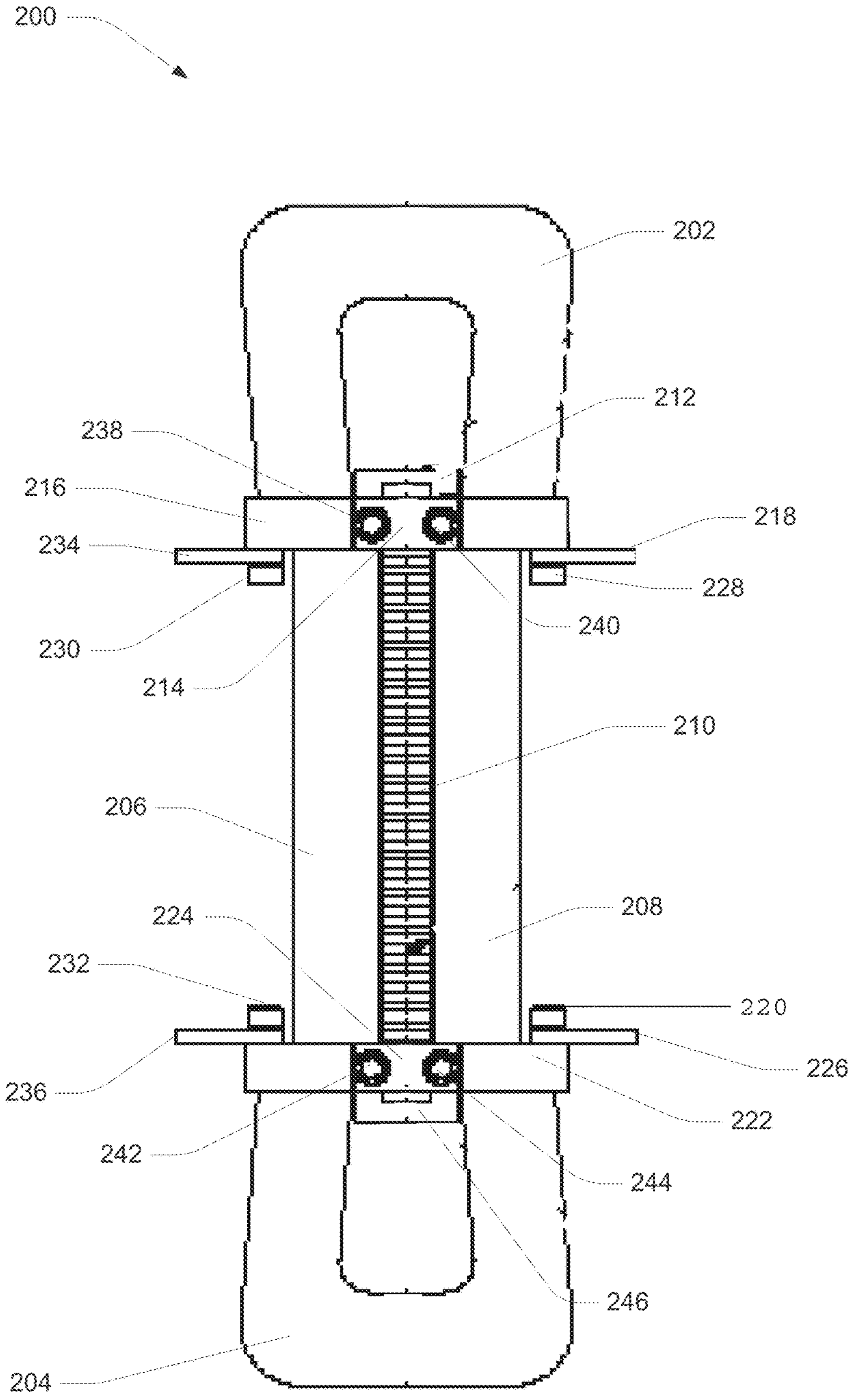
FIG. 2A shows a front view of a magnet assembly having rounded pole pieces, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble a ribbon microphone with rounded magnet motor assembly, a backwave chamber, and/or a phantom-powered FET circuit. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

Figure 2B:
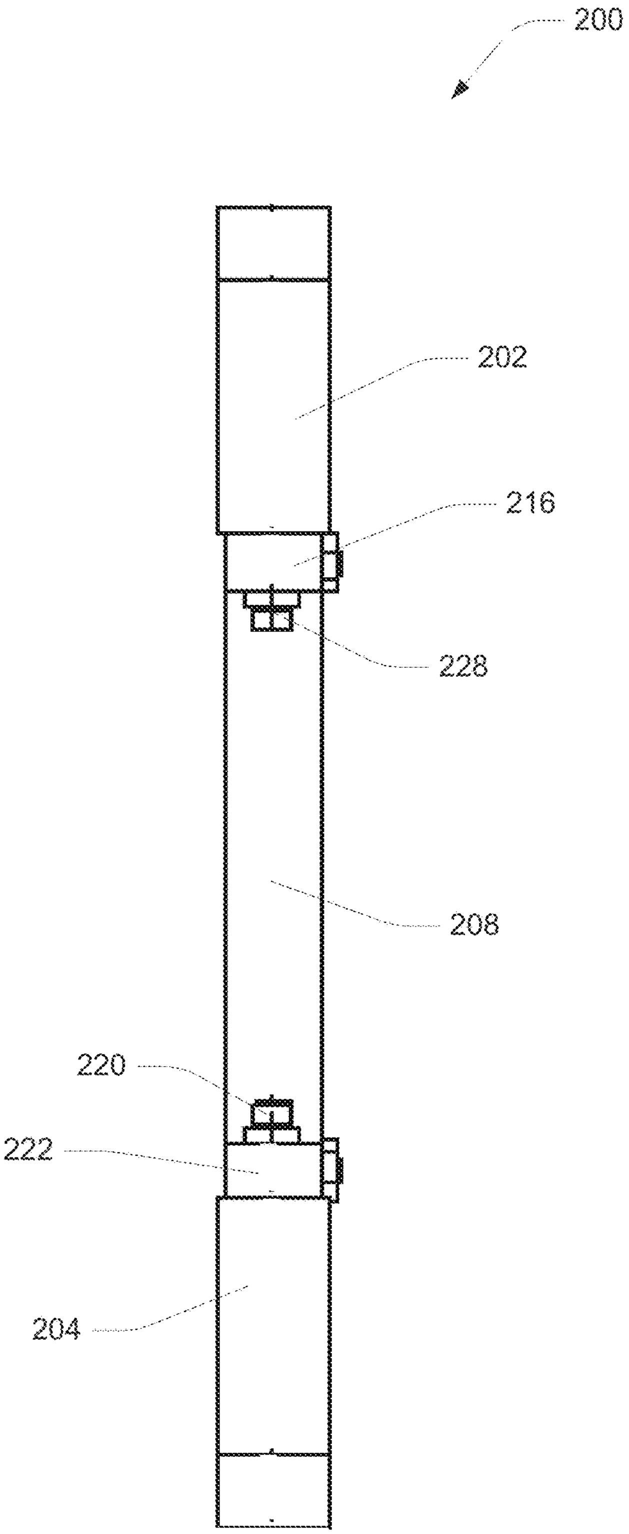
FIG. 2B shows a side view of the magnet assembly of FIG. 2A, in accordance with an embodiment of the invention.

Turning now to FIG. 2A, a front view of a preferred embodiment of a novel magnet assembly is disclosed. FIG. 2B discloses a side view of the preferred embodiment of the magnet assembly of FIG. 2A, and a perspective view is disclosed in FIG. 4. In the preferred embodiment of the invention, the novel magnet assembly is designed to be used with a ribbon microphone. In general, a ribbon microphone is a type of dynamic microphone using a thin "ribbon" typically made of aluminum, duraluminum, or nanofilm materials, which are positioned between the poles of a magnet to generate voltages by electromagnetic induction. Typically, an electric current is induced at right angles to the direction of the ribbon velocity and magnetic field. As a sound wave causes the ribbon to move, the induced current in the ribbon is proportional to the particle velocity caused by the sound wave.

As illustrated by the preferred embodiment disclosed in FIGS. 2A and 2B, a magnet assembly (200) comprises a first horseshoe magnet (202) and a second horseshoe magnet (204), which are separated by pole pieces (206, 208), wherein the pole pieces (206, 208) comprise ferromagnetic materials. The horseshoe magnets (202, 204) are aligned such that their polarizations are opposite with respect to one another. A first base (216) secures one end of the pole pieces (206, 208) to the first horseshoe magnet (202) while a second base (222) secures the other end of the pole pieces (206, 208) to the second horseshoe magnet (204).

Figure 4:
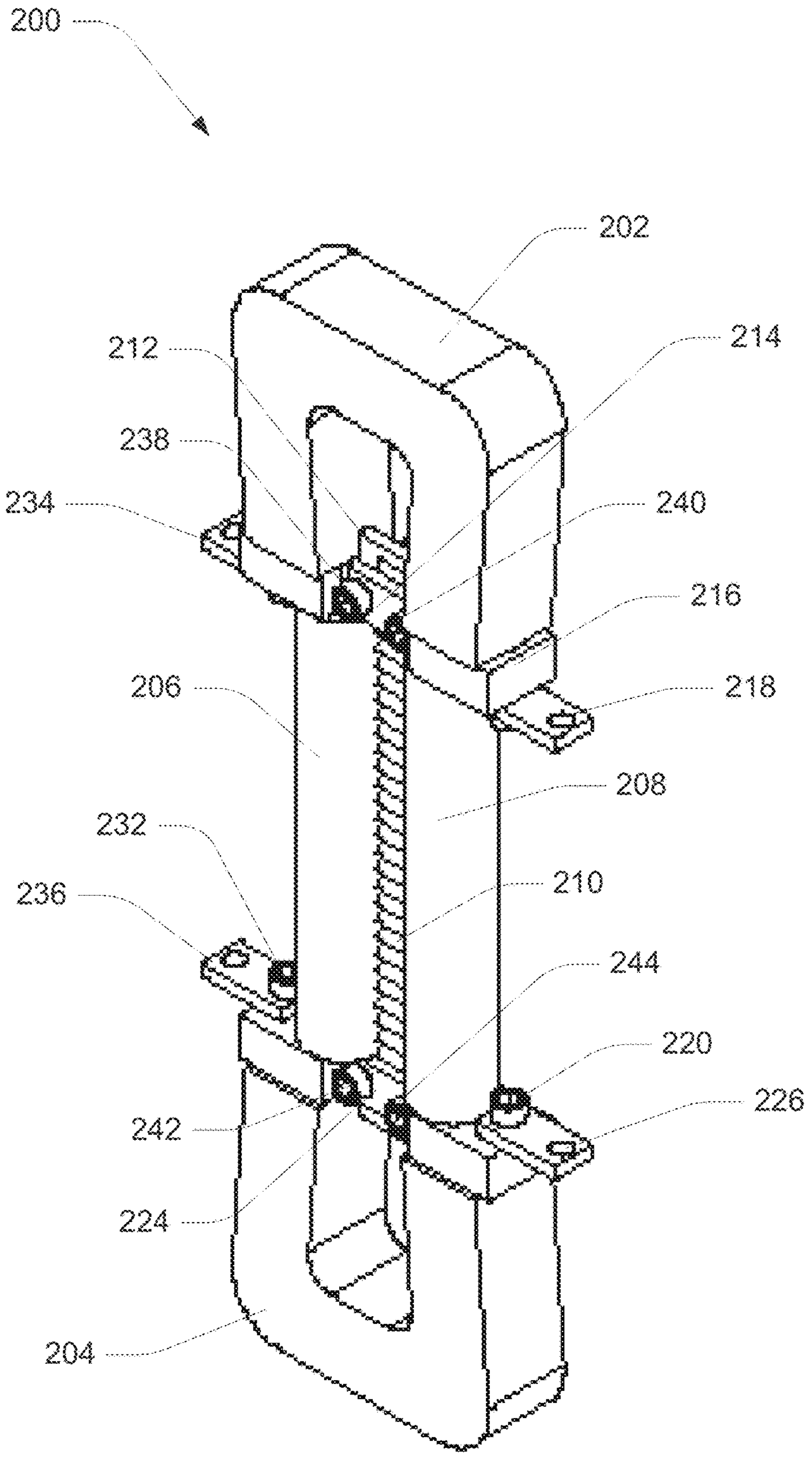
FIG. 4 shows a perspective view of the magnet assembly of FIG. 2A, in accordance with an embodiment of the invention.

In a preferred embodiment of the invention, each pole piece (206, 208) can be magnetized by a particular polarity of the horseshoe magnets (202, 204). Furthermore, in the preferred embodiment of the invention, each pole piece (206, 208) has a cylindrical surface as depicted in FIG. 4, which effectively diverges sound waves reflected off of the horseshoe magnets and/or the pole pieces to directions away from the ribbon (210). The divergence of the reflected waves minimize undesirable interferences from the reflected sound waves to the ribbon (210).

In one embodiment of the invention, the magnet assembly (200) comprises only a single horseshoe magnet in magnetic contact with a first pole piece (e.g. 206) and a second pole piece (e.g. 208). Using a second horseshoe magnet (e.g. 204 of FIG. 2A) may provide an advantage of increasing the magnetic strength of the magnet assembly (200).

Figure 5A:
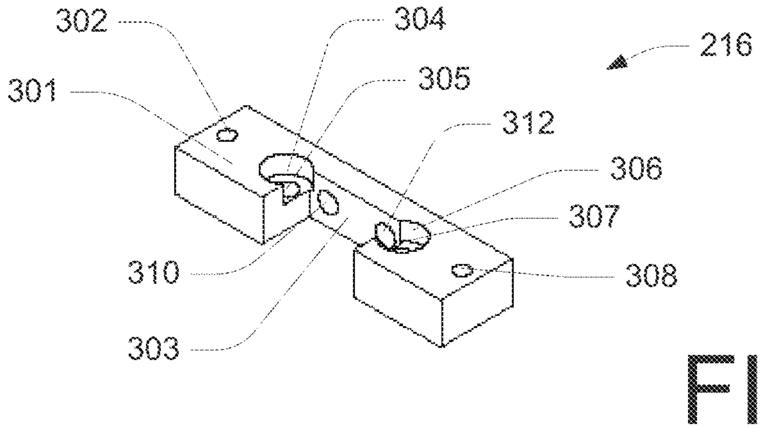
FIGS. 5A~C shows diagrams of a base of the magnet assembly of FIG. 2A, in accordance with an embodiment of the invention.
Figure 5B:
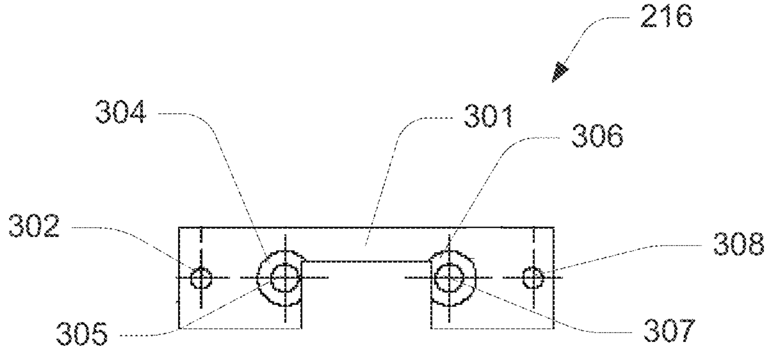
Figure 5C:
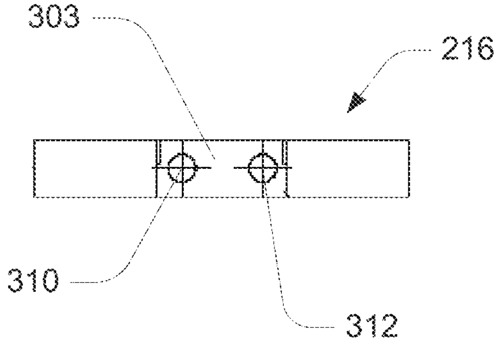

FIGS. 5A, 5B, and 5C disclose a preferred embodiment of the first base (216). FIG. 5A is a perspective view of the preferred embodiment for the first base (216). FIG. 5B is a top view of the preferred embodiment for the first base (216). In addition, FIG. 5C is a side view of the preferred embodiment for the first base (216).

In a preferred embodiment of the invention, the second base (222) exhibits similar or identical shapes and dimensions to the first base (216). As will be appreciated by one of ordinary skill in the art, FIGS. 5A-5C are merely disclosed as an example (i.e. a preferred embodiment) of a base and does not limit the scope of the invention. One of ordinary skill in the art will further appreciate that the first base (216) and the second base (222) may have a variety of shapes without departing from the scope of the present invention.

In the preferred embodiment of a base configuration as shown in FIGS. 5A-5C, the first base (216) is configured to include a plurality of apertures (e.g. 302, 304, 306, 308, 310, and 312). In one embodiment of the invention, a first aperture (302) and a second aperture (308) have similar or identical dimensions. Furthermore, in one embodiment of the invention, these two apertures (302, 308) are positioned and dimensioned to receive two screws (230 and 228 of FIG. 2A), respectively. Similarly, a third aperture (304) and a fourth aperture (306) may have similar or identical dimensions. In one embodiment of the invention, the third and the fourth apertures (304, 306) are positioned and dimensioned to receive two screws (250, 248 of FIG. 3A), respectively. Moreover, in one embodiment of the invention, a fifth aperture (310) and a sixth aperture (312) have similar or identical dimensions. The fifth and the sixth apertures (310, 312) may also be positioned and dimensioned to receive two screws (230 and 240 of FIG. 2A), respectively.

In a preferred embodiment of the invention, the first base (216) comprises a ferromagnetic material. In another embodiment of the invention, the first base (216) comprises a steel alloy. Yet in another embodiment of the invention, the first base (216) comprises a cobalt steel alloy. Furthermore, in one embodiment of the invention, the first base (216) has a width of 1.3 inch (i.e. 33.02 millimeters), a height of 0.2 inch (i.e. 5.08 millimeters), and a length of 0.35 inch (i.e. 8.89 mm). In the preferred embodiment of the invention, the second base (222) has the same dimensions as the first base (216).

As shown in FIG. 2A, in one embodiment of the invention, a ribbon (210) is held between the pole pieces (206, 208) by a first ribbon clamp comprising a first clamp element (214) and a first lower clamp element (212), and a second ribbon clamp comprising a second clamp element (224) and a second lower clamp element (246), wherein the first and second ribbon clamps secure the ribbon (210) to the first base (216) and the second base (222), respectively. In one embodiment of the invention, the ribbon (210) is held in a fixed position by the first ribbon clamp (i.e. 214, 212) on one end and by the second ribbon clamp (i.e. 224, 246) on the other end. A first set of screws (238, 240) attach the upper ribbon clamp to the first base (216). A second set of screws (242, 244) attach the lower ribbon clamp to the second base (222).

Figure 6A:
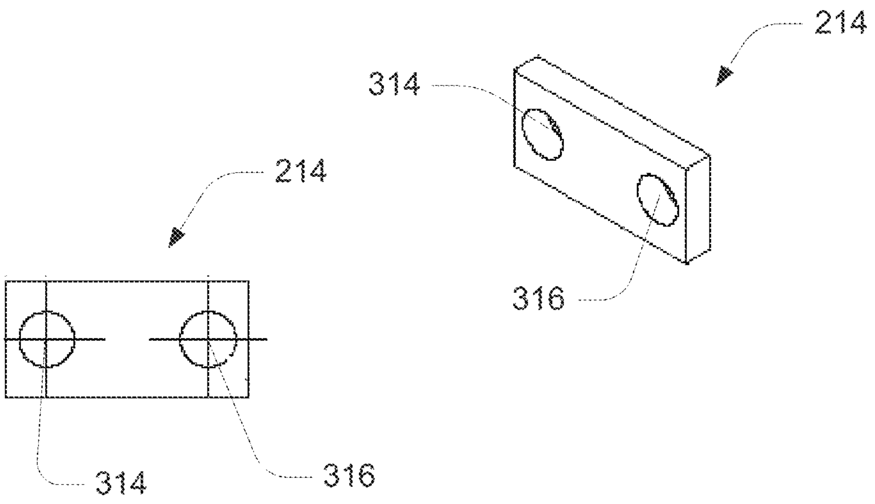
FIG. 6A shows a diagram of a clamp of the magnet assembly of FIG. 2A, in accordance with an embodiment of the invention.
Figure 6B:
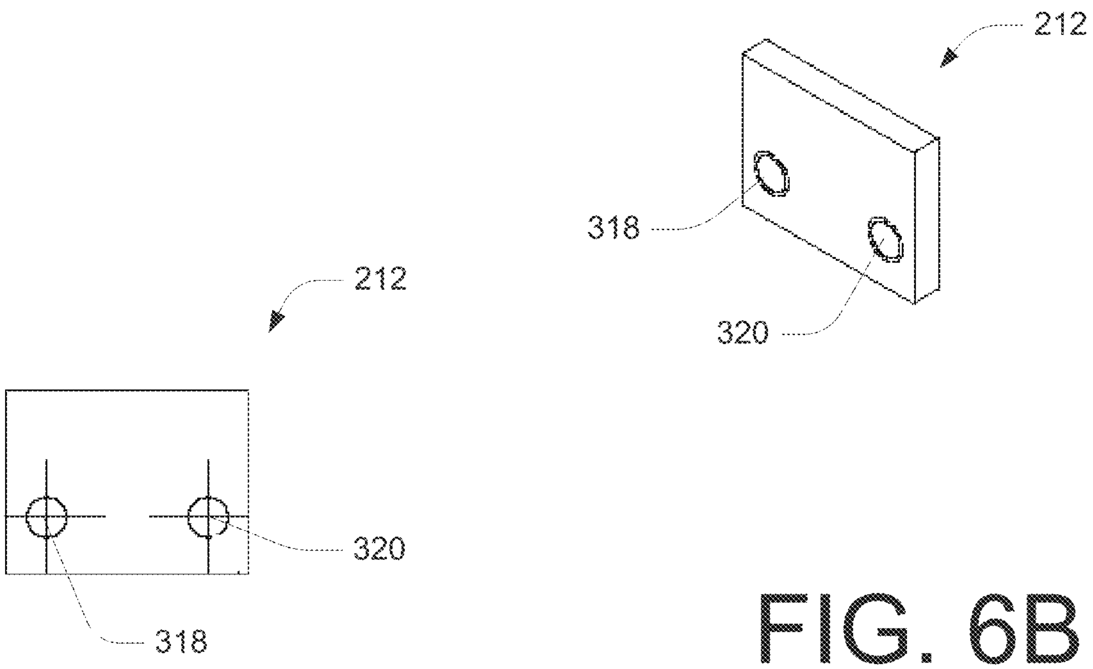
FIG. 6B shows a diagram of a lower clamp of the magnet assembly of FIG. 2A, in accordance with an embodiment of the invention.

Exemplary embodiments of a first clamp element (214) and a first lower clamp (212) are presented in FIGS. 6A and 6B, respectively. One of ordinary skill in the art will appreciate that the second clamp element (224) may be identical to the first clamp element (214), and a second lower clamp element (246) may be identical to the first lower clamp element (212). As will be appreciated by one of ordinary skill in the art, FIGS. 6A and 6B are presented for clarification and do not limit Applicants' invention. One of ordinary skill in the art will further appreciate that clamp elements (212, 214, 224, 246) could have a variety of shapes without departing from the scope of the present invention.

As shown in FIG. 6A, in one embodiment of the invention, the first clamp element (214) is configured to include one or more apertures (314, 316). In certain embodiments, these apertures (314, 316) are further configured, positioned, and/or dimensioned to receive the first set of screws of FIG. 2A (238, 240). Furthermore, in one embodiment of the invention, the first clamp element (214) comprises a copper cladding. In another embodiment of the invention, the first clamp element (214) comprises brass. Yet in another embodiment of the invention, the first clamp element (214) comprises a different metal. In a preferred embodiment of the invention, the first clamp element (214) has a width of 0.42 inches (10.668 mm) and a length of 0.06 inches (1.524 mm).

Moreover, as shown in FIG. 6B, in one embodiment of the invention, a first lower clamp element (212) is formed to include one or more apertures (318, 320). In certain embodiments, these apertures (318, 320) are further configured, positioned, and/or dimensioned to receive the first set of screws of FIG. 2A (238, 240). Furthermore, in one embodiment of the invention, the first lower clamp element (212) comprises a copper cladding. In a preferred embodiment of the invention, the first lower clamp element (212) has a width of 0.42 in (10.668 mm), a length of 0.06 in (1.524 mm), and a height of 0.320 in (8.128 mm).

Returning to FIG. 2A, in one embodiment of the invention, pole pieces (206, 208), bases (216, 222), clamp elements (214, 224), and lower clamp elements (212, 246) comprise an ferromagnetic alloy. In one embodiment of the invention, the magnetic alloy is an aluminum alloy. As will be appreciated by one of ordinary skill in the art, unless mixed with a ferromagnetic material, aluminum alloys are paramagnetic and are magnetic only in the presence of an external magnetic field, such as that resulting from horseshoe magnets (202, 204). In one embodiment of the invention, the magnetic alloy is a nickel alloy. In another embodiment of the invention, the magnetic alloy is a cobalt alloy. As will be appreciated by one of ordinary skill in the art, nickel and cobalt are ferromagnetic materials and therefore are permanent magnets. Yet in another embodiment of the invention, the magnetic alloy is a combination of aluminum, nickel, and cobalt. As will be appreciated by one of ordinary skill in the art, alloys of aluminum, nickel, and cobalt are referred to as alnicos and are ferromagnetic.

As shown in FIG. 2A, the magnet assembly (200) further comprises clamps (218, 234) secured to the first base (216) via screws (228, 230), respectively, and clamps (226, 236) secured to the second base (222) via screws (220, 232), respectively. In one embodiment of the invention, screws (e.g. 228, 230, 220, 232, 238, 240, 242, and 244) are socket head cap screws. The screws (e.g. 228, 230, 220, 232, 238, 240, 242, and 244) may also be corrosion-resistant steel. In one embodiment of the invention, the screws (e.g. 220, 228, 230, and 232) are ¼ inch in length.

Figure 3A:
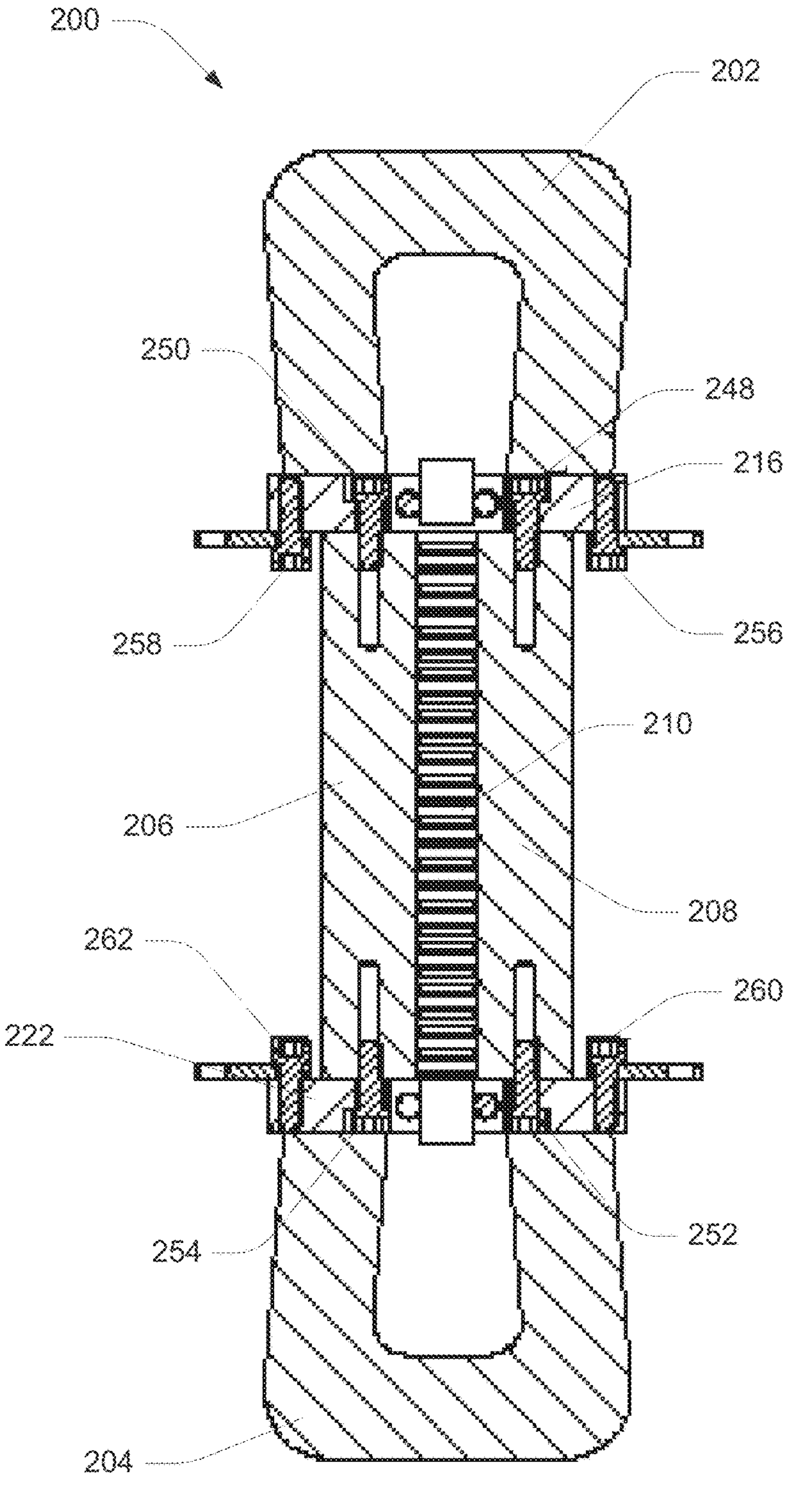
FIG. 3A shows a cross section of the magnet assembly of FIG. 2A, in accordance with an embodiment of the invention.

Turning now to FIG. 3A, a cross section of the magnet assembly (200) is disclosed as a preferred embodiment of the invention. As shown in FIG. 3A, pole pieces (206, 208) are secured to bases (216, 222) via screws (248, 250, 252, 254). In one embodiment of the invention, screws 248, 250, 252, and 254 are socket head cap screws. In one embodiment of the invention, screws (e.g. 248, 250, 252, and 254) are socket head cap screws. The screws (e.g. 248, 250, 252, and 254) may also be corrosion-resistant steel. In one embodiment of the invention, the screws (e.g. 248, 250, 252, and 254) are ¼ inch in length.

Figure 3B:
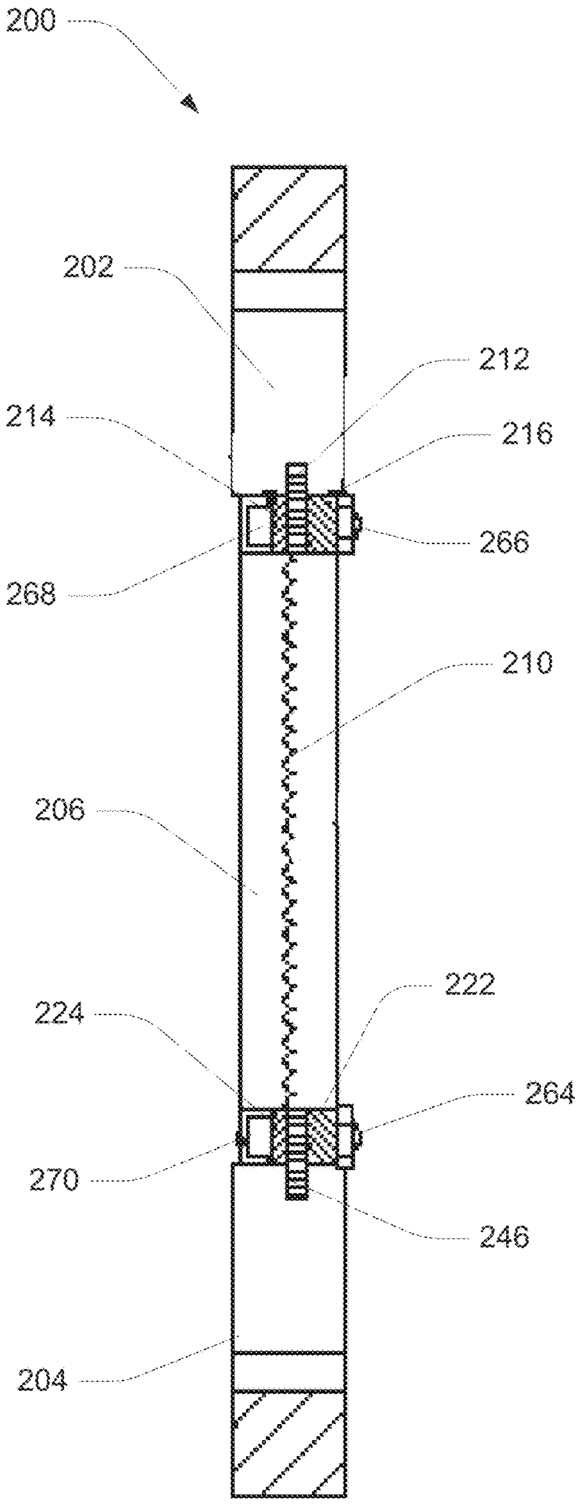
FIG. 3B shows another side view of the magnet assembly of FIG. 2A, in accordance with an embodiment of the invention.

FIG. 3B discloses a side-view cross section of the magnet assembly (200) as a preferred embodiment of the invention. As shown in FIG. 3B, the magnet assembly (200) further comprises screws (268, 270) secured by nuts (266, 264), respectively. While not depicted in FIG. 3B, one of ordinary skill in the art will appreciate that other screws (e.g. 240, 244 of FIG. 4) may be similarly secured with nuts.

Figure 7A:
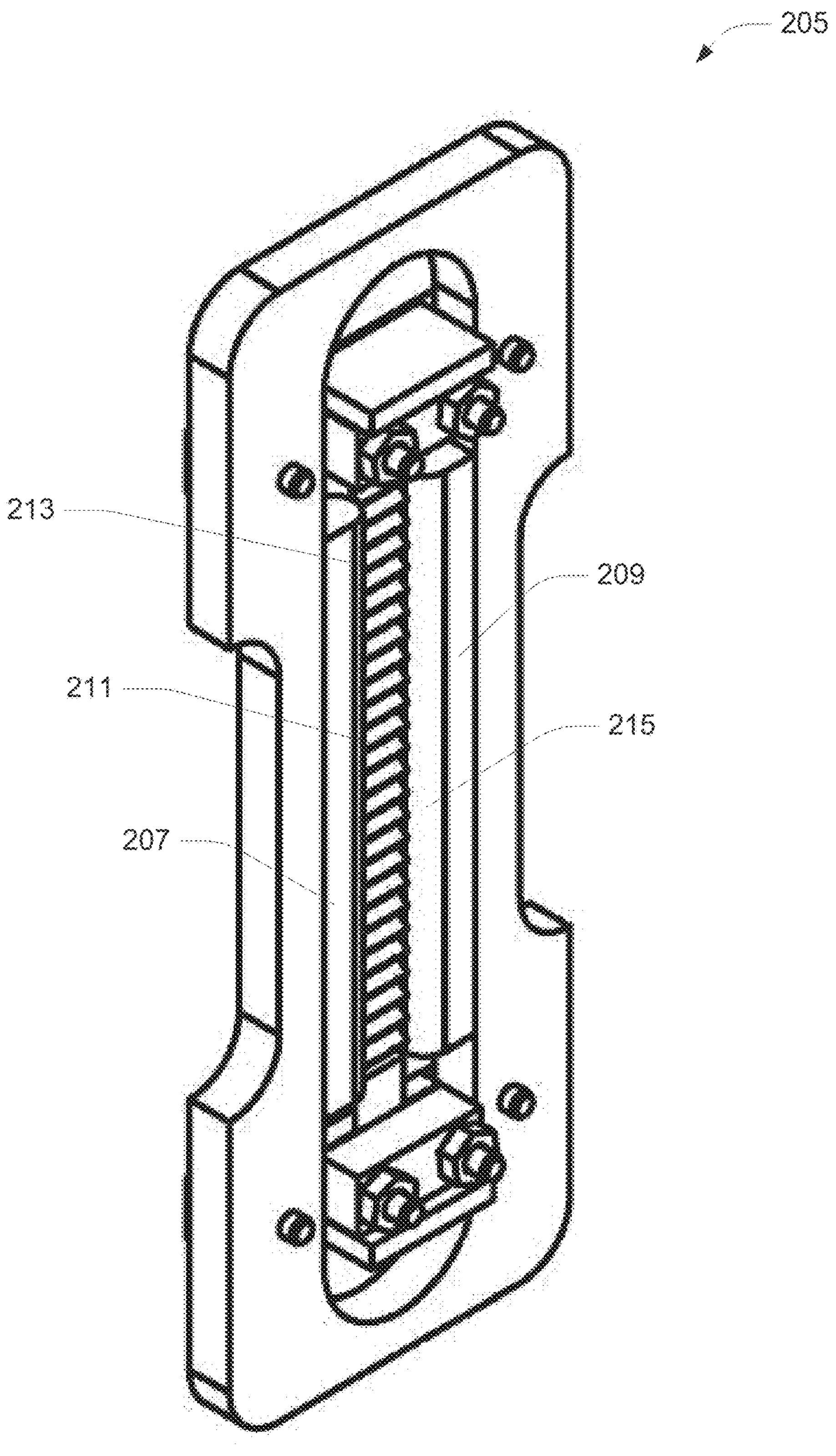
FIG. 7A shows a diagram of another magnet assembly having rounded bar magnets, in accordance with an embodiment of the invention.
Figure 7B:
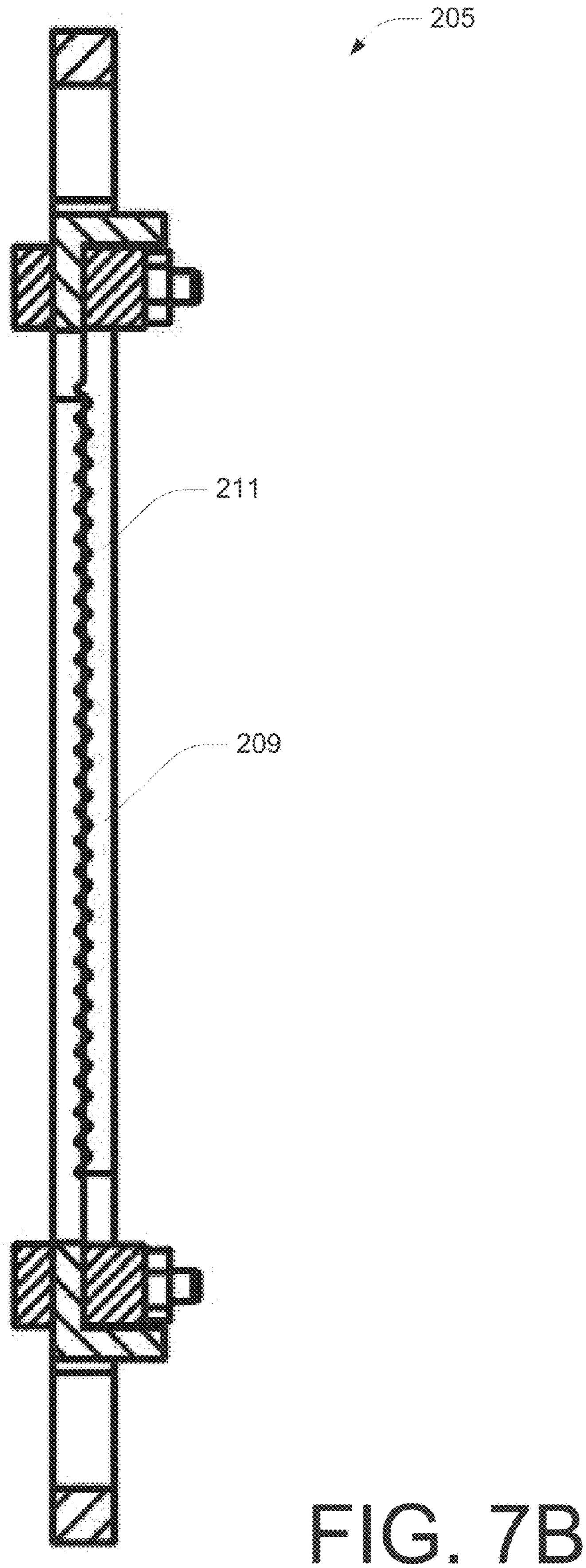
FIG. 7B shows a cross section of the magnet assembly of FIG. 7A, in accordance with an embodiment of the invention.
Figure 7C:
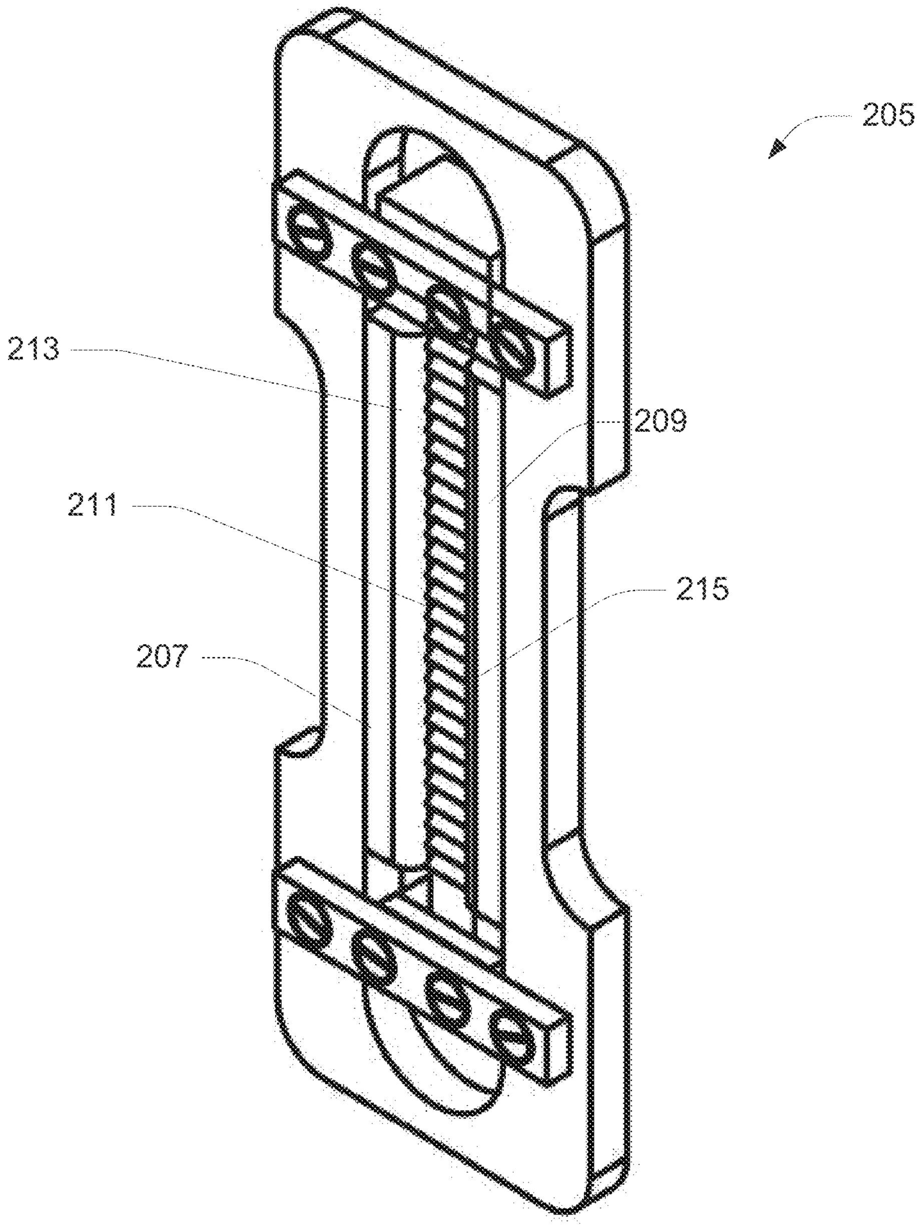
FIG. 7C shows a diagram of a rear side of the magnet assembly of FIG. 7A, in accordance with an embodiment of the invention.

An alternative embodiment of a magnet assembly (205) of the present invention is depicted in FIG. 7A. Furthermore, FIG. 7B shows a cross-sectional view of the magnet assembly (205) of FIG. 7A. Additionally, FIG. 7C shows another view of the magnet assembly (205) of FIG. 7A. In the alternative embodiment of FIG. 7A, rather than utilizing pole pieces, the magnet assembly (205) comprises bar magnets (207, 209) located on a left side and a right side of a ribbon (211). In a preferred embodiment of the invention, a first edge (213) of a first bar magnet (207) and a second edge (215) of a second bar magnet (209) facing toward the ribbon (211) may comprise convex-shaped surfaces (i.e. defined herein as "rounded magnets", which are unique to a novel ribbon microphone configuration of the present invention). Furthermore, the first and the second edges (213, 215) have opposing polarities. In an alternative embodiment of the invention, one or more horseshoe magnets (202, 204) are utilized.

Figure 12A:
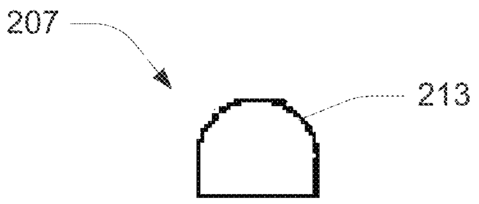
FIGS. 12A~C shows diagrams of the rounded bar magnets of the magnet assembly of FIG. 7A, in accordance with an embodiment of the invention.
Figure 12B:
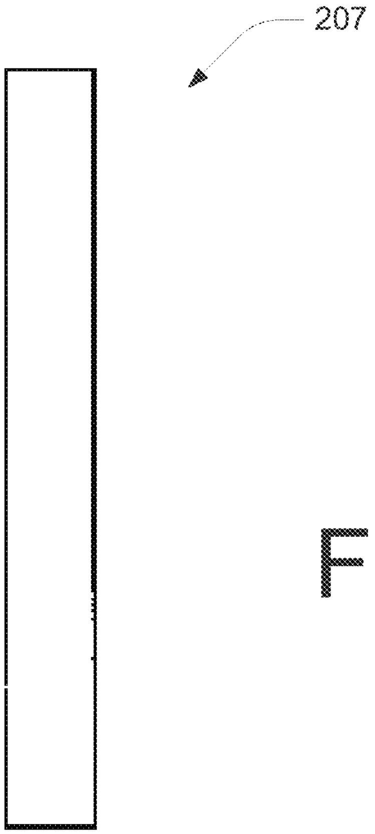
Figure 12C:
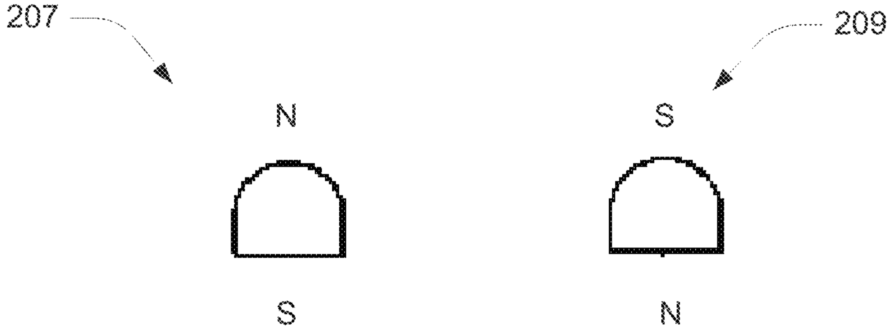

A preferred embodiment of the bar magnet (207) is presented in FIGS. 12A and 12B. As shown in these figures, the bar magnet (207) may have a rounded edge (213). FIG. 12C illustrates the polarity of two bar magnets (207, 209). As shown in FIGS. 12C and 8B, a first bar magnet (207 or 307) is polarized from north to south, and a second bar magnet (209, 309) is polarized from south to north. In one embodiment of the invention, the bar magnets (207, 209) comprise nickel-plated neodymium. The two bar magnets (207, 209) may have the same dimensions, or have different dimensions from each other. In one embodiment of the invention, the two bar magnets (207, 209) each have a width of 0.236 inches (6.00 mm), a height of 0.197 inches (5.00 mm), and a length of 1.978 inches (50.25 mm).

Figure 8A:
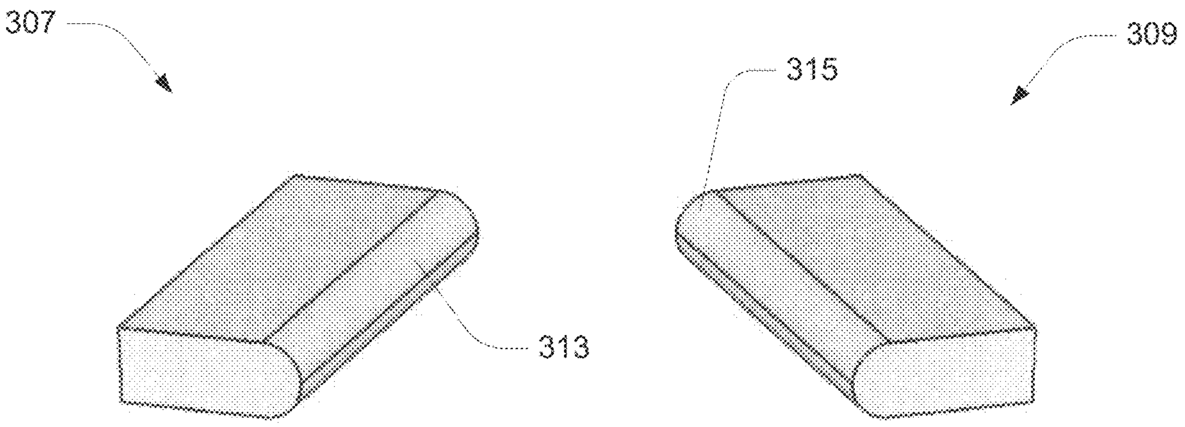
FIGS. 8A~B shows diagrams of a rounded bar magnet in accordance with an embodiment of the invention.
Figure 8B:

Another embodiment of bar magnets in accordance with the present invention is disclosed in FIGS. 8A and 8B. In this embodiment, a first bar magnet (307) is polarized from north to south, and the second bar magnet (309) is polarized from south to north. In one embodiment of the invention, bar magnets (307, 309) comprise nickel-plated neodymium. The two bar magnets (307, 309) may have the same dimensions, or have different dimensions from each other. In one embodiment of the invention, the two bar magnets (307, 309) each have a width of 0.397 inches (10.084 mm), a height of 0.160 inches (4.064 mm), and a length of 0.907 inches (32.028 mm). Furthermore, in one embodiment of the invention, the radius of curvature for the two edges (313, 315) of each bar magnet may be 0.8 inches (0.162 mm).

In one embodiment of the invention, bar magnets (e.g. 207, 209, 307, 309) comprise ferromagnetic alloys. The ferromagnetic alloys may be made of cobalt, alnico, neodymium, and/or other appropriate substances. In one embodiment of the invention, the bar magnets (e.g. 207, 209, 307, 309) are anisotropic. In another embodiment of the invention, the bar magnets (e.g. 207, 209, 307, 309) are isotropic.

One of ordinary skill in the art will appreciate that when a sound wave strikes a non-absorbent surface, the characteristics of a reflected sound wave is dependent upon the characteristics of the non-absorbent surface. FIG. 1A shows the reflection of sound waves from a rigid, plane surface. FIG. 1B shows a ray diagram of FIG. 1A for further clarification of this phenomenon. As shown in FIG. 1A, the solid-line wavefronts strike a planar surface, and the reflected wavefronts are illustrated as dashed lines. The angle of reflection for a wave striking a planar surface is given by the Law of Reflection and is equal to the angle of incidence. Thus, as illustrated in FIGS. 1A and 1B, a sound wave traveling perpendicular to the surface will be reflected in a coherent manner directly back towards the source of the sound. A receiver in this path will receive both the direct sound emanating from the original source and the indirect sound reflected from the surface. This reflected sound is perceived as an undesirable "echo" and can degrade the quality of the direct sound from the original source.

Furthermore, the reflection of sound waves onto a ribbon of a ribbon microphone has a negative affect on a microphone's frequency response curve. In general, the frequency response of a microphone measures how the microphone responds to different frequencies. Each microphone has a unique frequency response curve resulting from whether the microphone exaggerates or attenuates various frequencies. One of ordinary skill in the art will appreciate that a "flat" frequency response means the microphone is equally sensitive to all frequencies, with no frequencies being exaggerated or reduced. Such a flat response generates a more accurate representation of an original sound. Sound waves reflected from the sides of a flat magnet onto the ribbon interfere with an accurate recording of a direct sound emanating from a source by causing phase cancellation or doubling effects.

The magnet assembly (200) as shown in FIGS. 2A, 2B, 3A, 3B, and 4 in accordance with one embodiment of the invention using cylindrical pole pieces (e.g. 206, 208), or another magnet assembly (205) as shown in FIGS. 7A, 7B, and 7C using rounded-edge magnets (e.g. 207, 209, 307, 309) in accordance with another embodiment of the invention cause sound waves striking the pole pieces (e.g. 206, 208) or the rounded-edge magnets (e.g. 207, 209, 307, 309) to be reflected away from the ribbon (e.g. 210, 211). This way, the sound waves striking the ribbon (e.g. 210, 211) directly within the magnet assembly (200) are less interfered with nearby reflected sound waves.

FIG. 1C shows sound waves reflecting from a convex surface. FIG. 1D shows a ray diagram of the same reflections illustrated in FIG. 1C. A sound wave striking a convex surface is reflected in a divergent manner due to the curvature of the surface, which diffuses the reflected sound waves. Therefore, the ribbon (e.g. 210, 211) is able to capture the direct sound emanating from its original source with minimal interferences from the reflected sound waves, thereby producing in a flatter frequency response curve for a ribbon microphone using the rounded magnets instead of conventional flat-surface magnets. The rounded magnet configuration of the present invention, as shown in FIGS. 1C, 1D, 7A, 7C, 8A, and 8B are novel features of the present invention. In particular, the bar magnets (207, 209) of FIG. 7A and FIG. 7C show rounded curves on at least one side of each bar magnet facing the ribbon (211). The rounded curvature of the bar magnets (207, 209) or magnetized pole pieces (e.g. 206, 208 of FIG. 4) are unique to the present invention and is specifically intended to produce more desirable frequency responses by minimizing reflected sound wave interferences with the vibration of the ribbon (211), compared to conventional magnet shapes of conventional ribbon microphones.

Figure 9A:
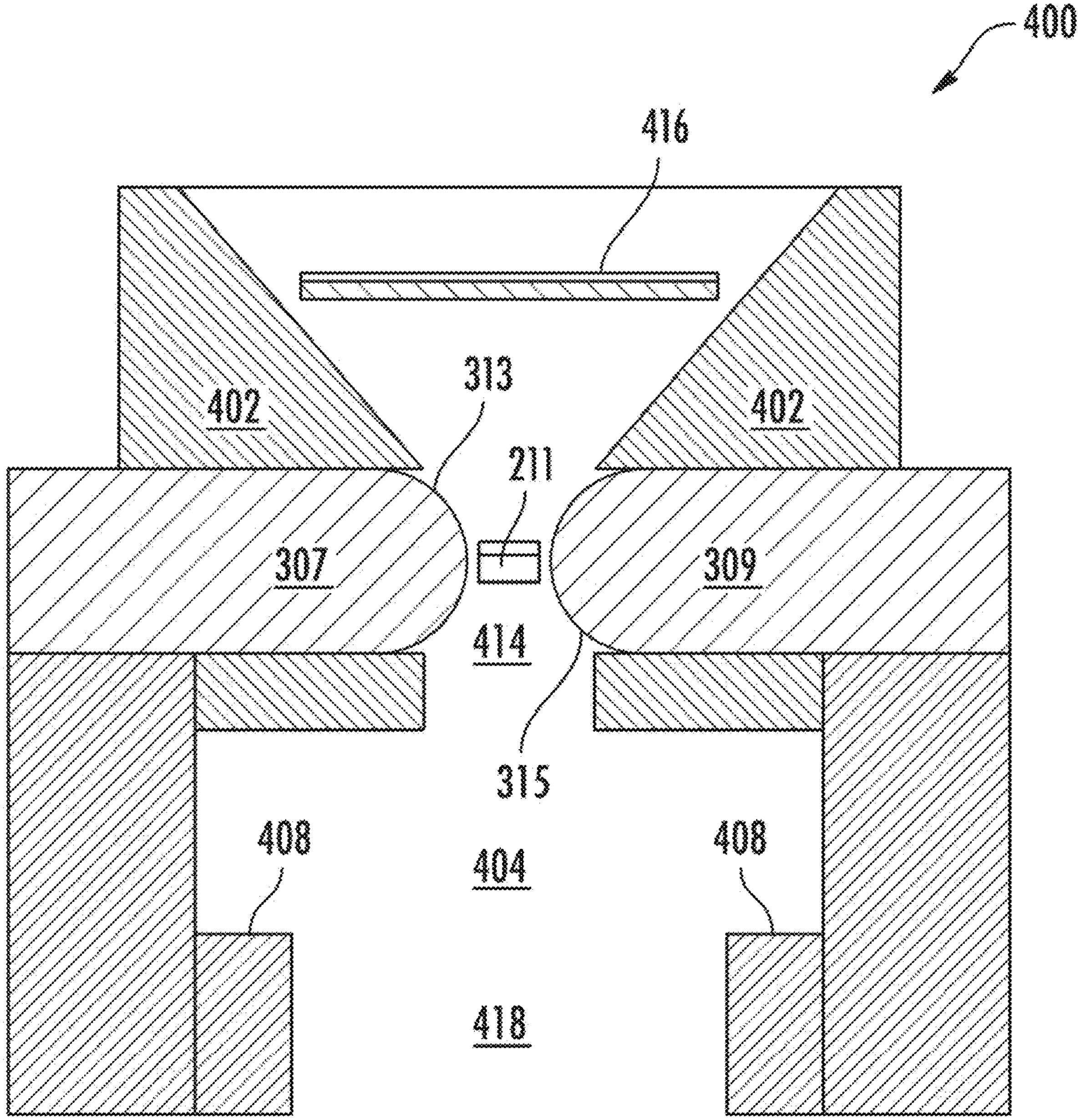
FIG. 9A shows a cross-sectional view of a microphone motor using a magnet assembly in accordance with an embodiment of the invention.
Figure 9B:
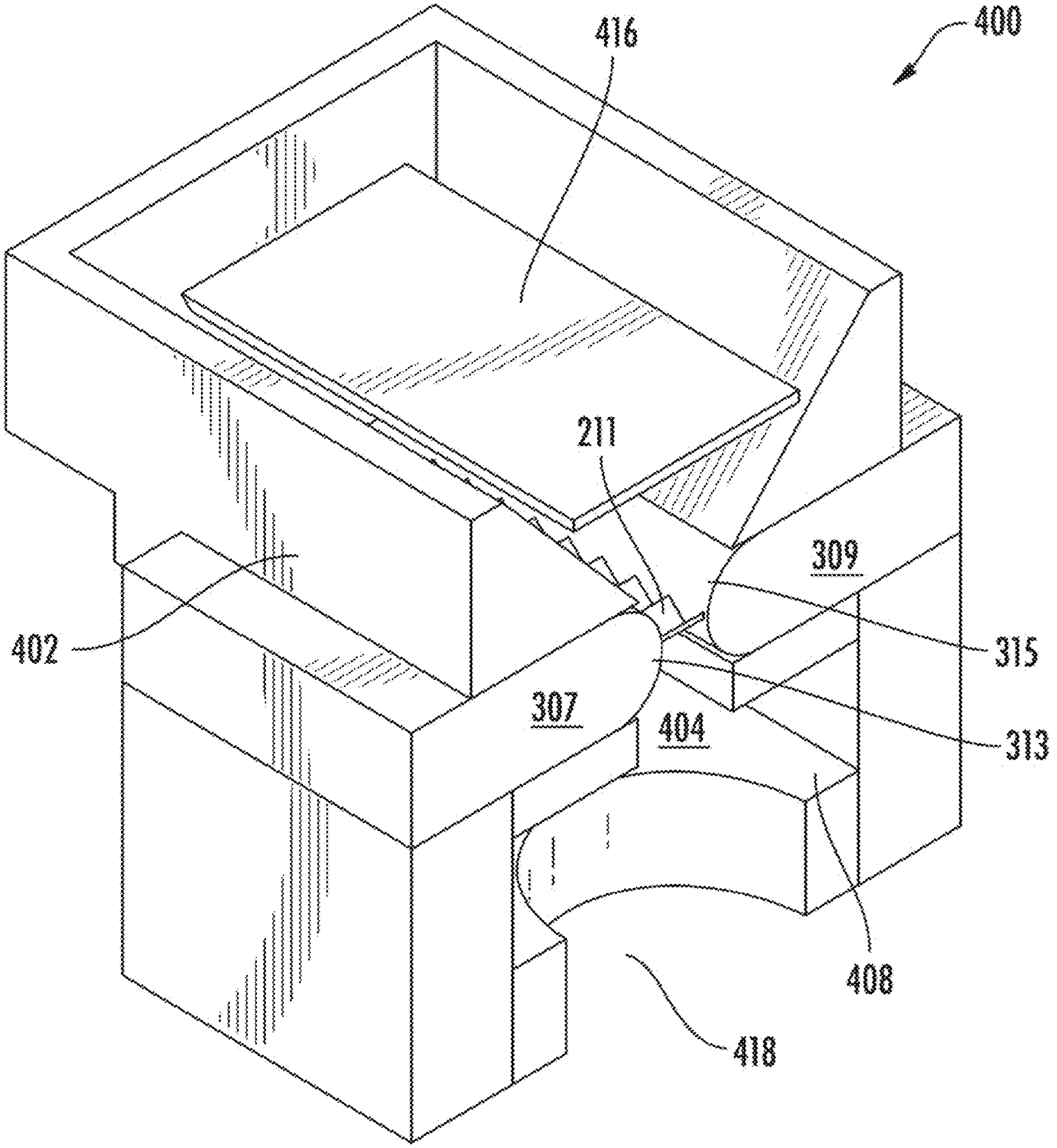
FIG. 9B shows a perspective view of the microphone motor of FIG. 9A in accordance with an embodiment of the invention.
Figure 9C:
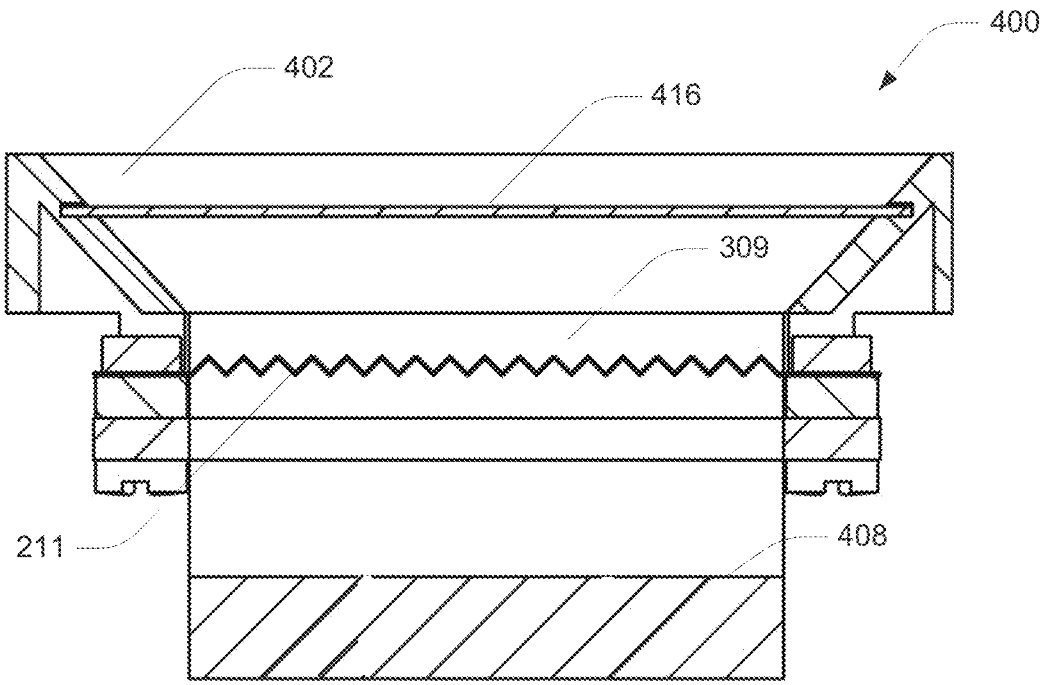
FIG. 9C shows a cross section of the microphone motor of FIG. 9A in accordance with an embodiment of the invention.
Figure 9D:
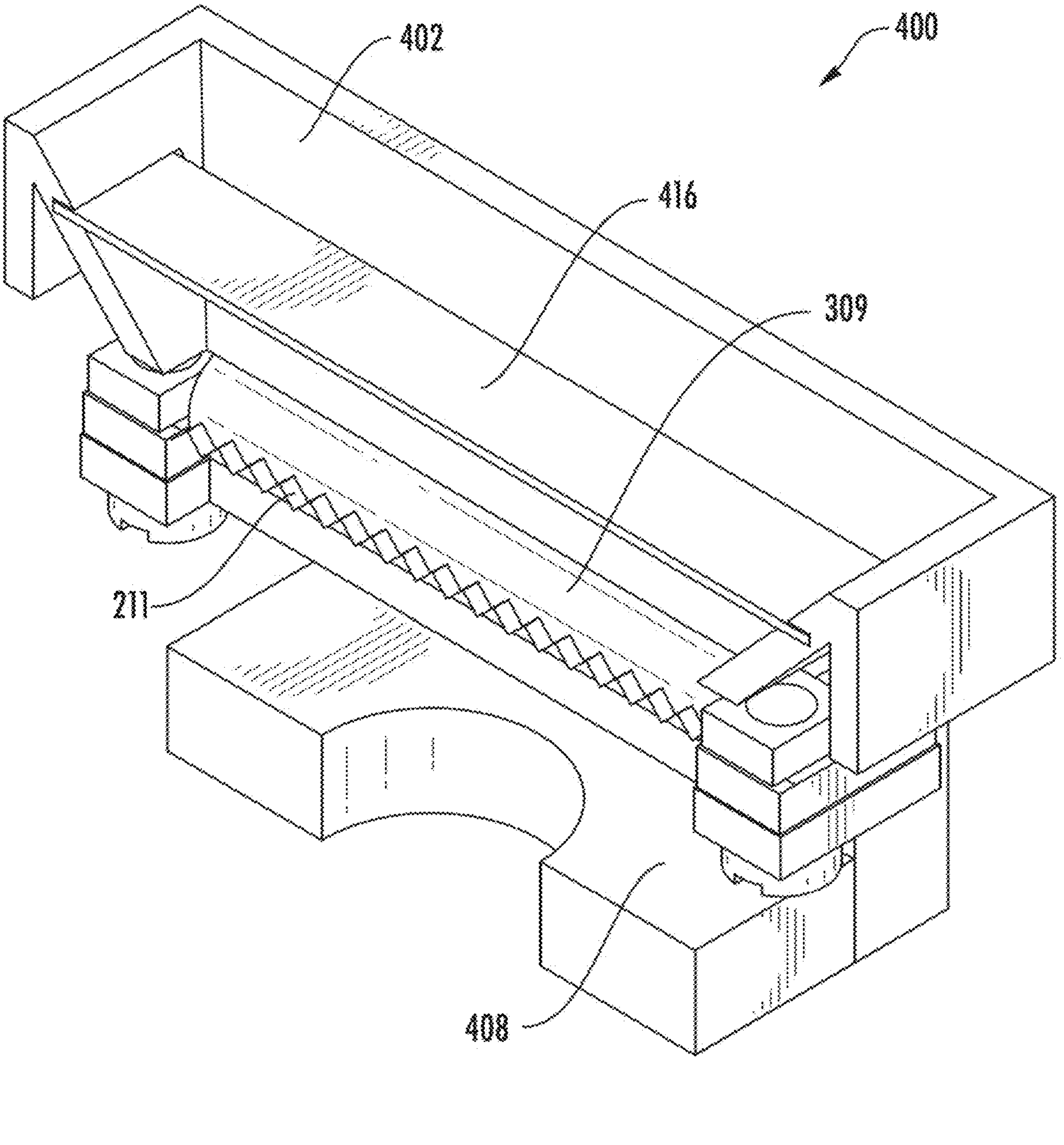
FIG. 9D shows a perspective view of the cross section presented in FIG. 9C in accordance with an embodiment of the invention.

In one embodiment of the invention, the rounded-edge bar magnets (e.g. 207, 209), also called "rounded magnets" in context of the Specification, are used to form a "microphone motor" (400). FIG. 9A shows a cross-sectional view of a microphone motor (400) using the magnet assembly (e.g. 205 of FIGS. 7A~7C) in accordance with a preferred embodiment of the invention. Furthermore, FIG. 9B discloses a perspective view of the microphone motor (400) of FIG. 9A. In addition, FIG. 9C shows another cross-sectional view of the microphone motor (400) of FIG. 9A, while FIG. 9D shows a perspective view of the cross section of FIG. 9C.

As shown in FIG. 9A, the microphone motor (400) comprises a blast filter comprising a baffle (402) and a filter (416), which directs sound emanating from a sound source onto a ribbon (211). In a preferred embodiment of the invention, the filter (416) is located within the baffle (402) and above the ribbon (211), to protect the ribbon (211) from high pressure sound waves by dissipating the pressure of a high SPL (Sound Pressure Level) sound source. As shown in FIG. 9A, the baffle (402) is sloped to guide the sound waves downward toward the ribbon (211) through the sloped surfaces of the baffle (402), thereby successfully reducing the pressure and protecting the ribbon (211). In one embodiment of the invention, all sides of the filter (416) are attached to the baffle (402). In another embodiment of the invention, only two sides of the filter (416) are attached to the baffle (402).

In a preferred embodiment of the invention, to the backside of the ribbon (211), the microphone motor (400 or 500) of FIGS. 9A~9D and FIGS. 10A~10D further comprises a backwave chamber comprising a primary chamber (404) and a secondary chamber (e.g. 406 of FIG. 10A) connected by an acoustic-coupling tube.

As will be appreciated by one of ordinary skill in the art, a microphone having a cardioid pickup pattern is predominantly sensitive to sound emanating from one direction. The microphone with the cardioid pickup pattern record sound primarily from the front of the microphone and secondarily from the sides, while rejecting sound from the back of the microphone. The difficulty in designing a cardioid ribbon microphone is that sound waves are received on both sides of the ribbon. In order for a ribbon microphone to have a cardioid pickup pattern, the backside of the ribbon must be partially closed to prevent sound emanating from that direction from striking the ribbon. However, closing the backside creates acoustic pressure that interferes with the natural ribbon movements. Furthermore, the reflections of the sound coming through the ribbon from the front side into the backside could cause anomalies in frequency response of a ribbon microphone. The sound waves reaching the backside of a ribbon can cause phase cancellations and other undesirable signal distortions which may reduce fidelity of a microphone. Phase cancellations and signal distortions may be significant problems in ribbon microphones, in which a backside of a ribbon could reflect a negative image of the sound when a front side of the ribbon is capturing a positive image of the sound.

In order to reduce or eliminate these shortcomings associated with a conventional ribbon microphone, a cardioid ribbon microphone embodied by the present invention may be designed with a novel backwave chamber, wherein the backwave chamber is sufficiently large and/or exhibit sufficient sound-absorption characteristics to minimize the acoustic pressure and minimize anomalies in the frequency response of the microphone.

As will be further appreciated by those of ordinary skill in the art, the vibrating ribbon (e.g. 211) itself produces a backwave off of the ribbon's back surface which can cause additional anomalies in the frequency response if the backside of the ribbon is closed off. The backwave reflects off of the walls of the chamber and is directed back towards the rear of the ribbon where it can cause undesirable phase cancellation and doubling effects. Therefore, for a conventional microphone design without the novel backwave chamber of the present invention, a limited low frequency response and resonance peaks in the audible mid range is a significant problem. The novel backwave chamber of the present invention reduces or eliminates the limited low frequency response and resonance peaks in the audible mid range commonly associated with existing microphone designs.

The microphone motor (400) of the present invention is helpful for a cardioid ribbon microphone having a frequency response curve with minimal anomalies by utilizing a large backwave chamber, wherein the backwave chamber comprises a primary chamber (404) and a secondary chamber (406) which are treated with a sound absorbing and/or dampening material. As shown in FIG. 9A, the primary chamber (404) is located directly beneath the ribbon (211) in a preferred embodiment of the invention. Sides (410, 412) of the primary chamber (404) comprise the side walls of the microphone motor (400). The primary chamber (404) is further formed to include a first opening (414) beneath the ribbon (211) to allow waves emanating from the back of the ribbon (211) to enter the primary chamber (404) and a second opening (418) formed to accept an acoustic coupling tube.

In one embodiment of the invention, all the surfaces of the primary chamber (404) are covered with a sound absorbing and/or dampening material. In another embodiment of the invention, only some of the surfaces of the primary chamber (404) are covered with a sound absorbing and/or dampening material. For example, a surface (408) of the primary chamber (404) may be covered with a fabric. The fabric could be sound-absorbing and non-reflective. In one embodiment of the invention, the fabric may also be felt materials and approximately ⅛ inches thick.

Furthermore, in one embodiment of the invention, the primary chamber (404) is filled with a sound-absorbing material. As will be appreciated by one of ordinary skill in the art, the sound-absorbing material dampens and dissipates sound waves in the primary chamber (404). In another embodiment of the invention, the primary chamber (404) is partially filled with a sound-absorbing material. The second opening (418) may also be filled with a sound-absorbing material, in some embodiments of the invention. The sound-absorbing material could be polyester fiber, polyethylene terephthalate (PET) fiber, foam, wool, fiberglass, nylon fiber, other sound absorbing materials, or a combination thereof.

Figure 10A:
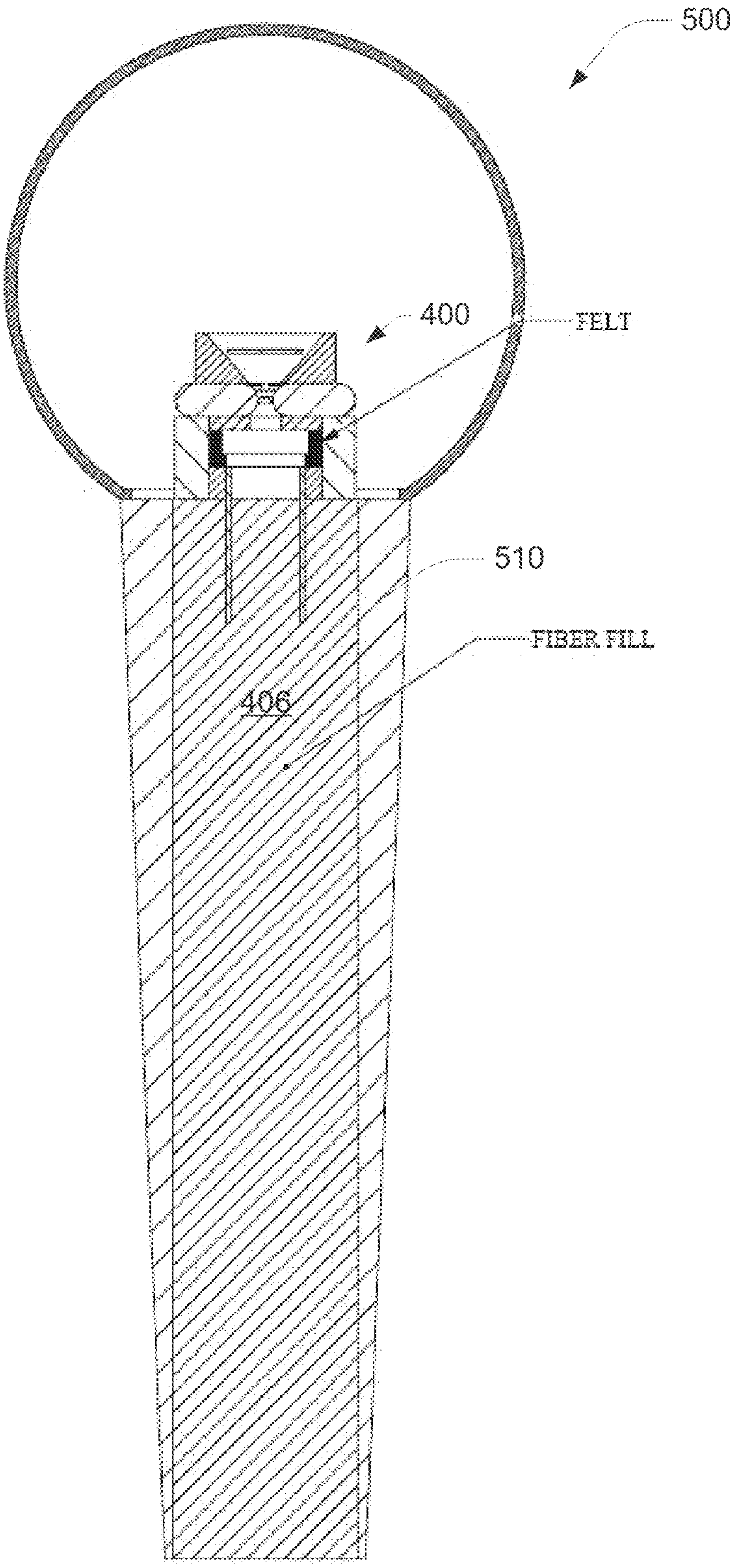
FIG. 10A shows a backwave chamber in accordance with an embodiment of the invention.
Figure 10B:
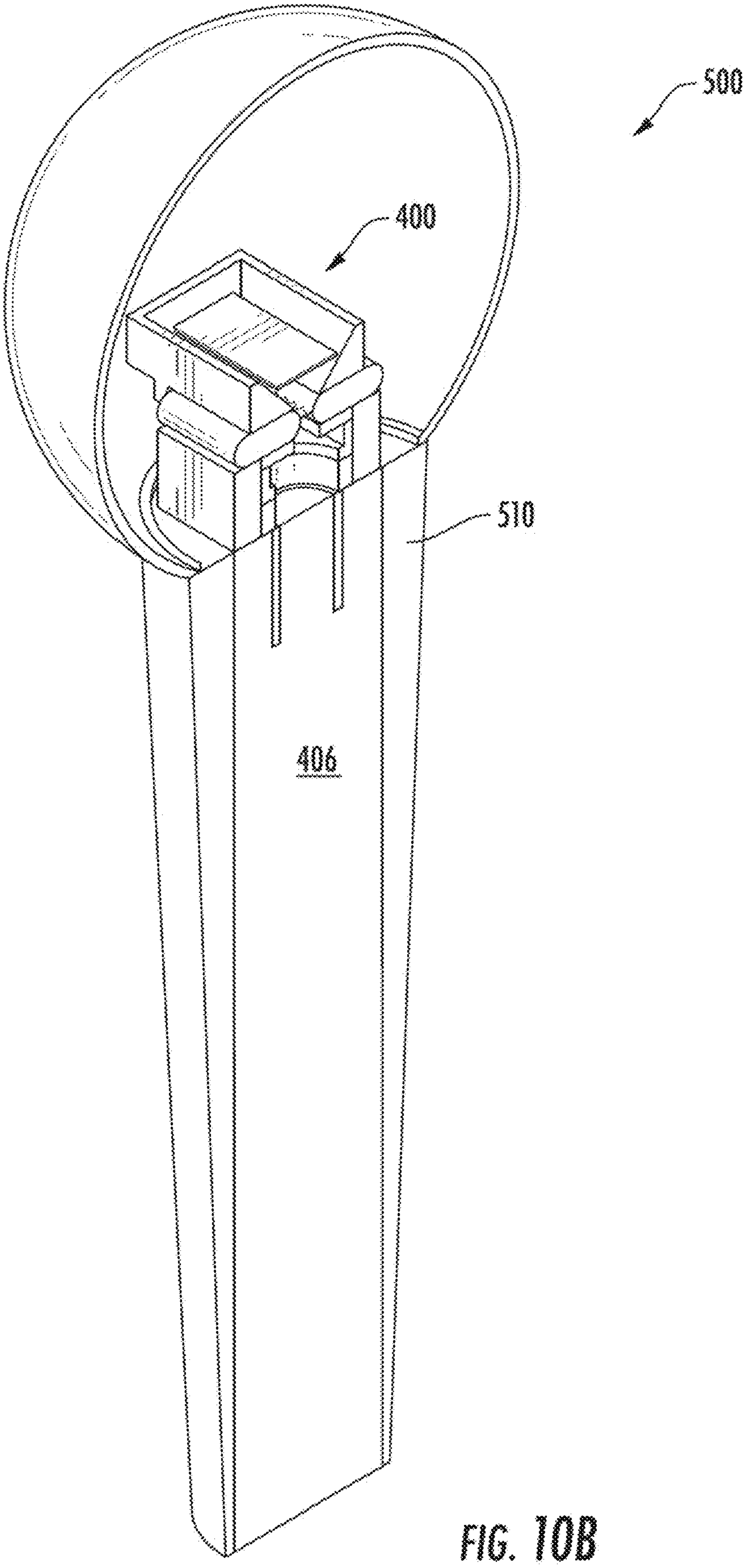
FIG. 10B shows a perspective view of the backwave chamber of FIG. 10A in accordance with an embodiment of the invention.
Figure 10C:
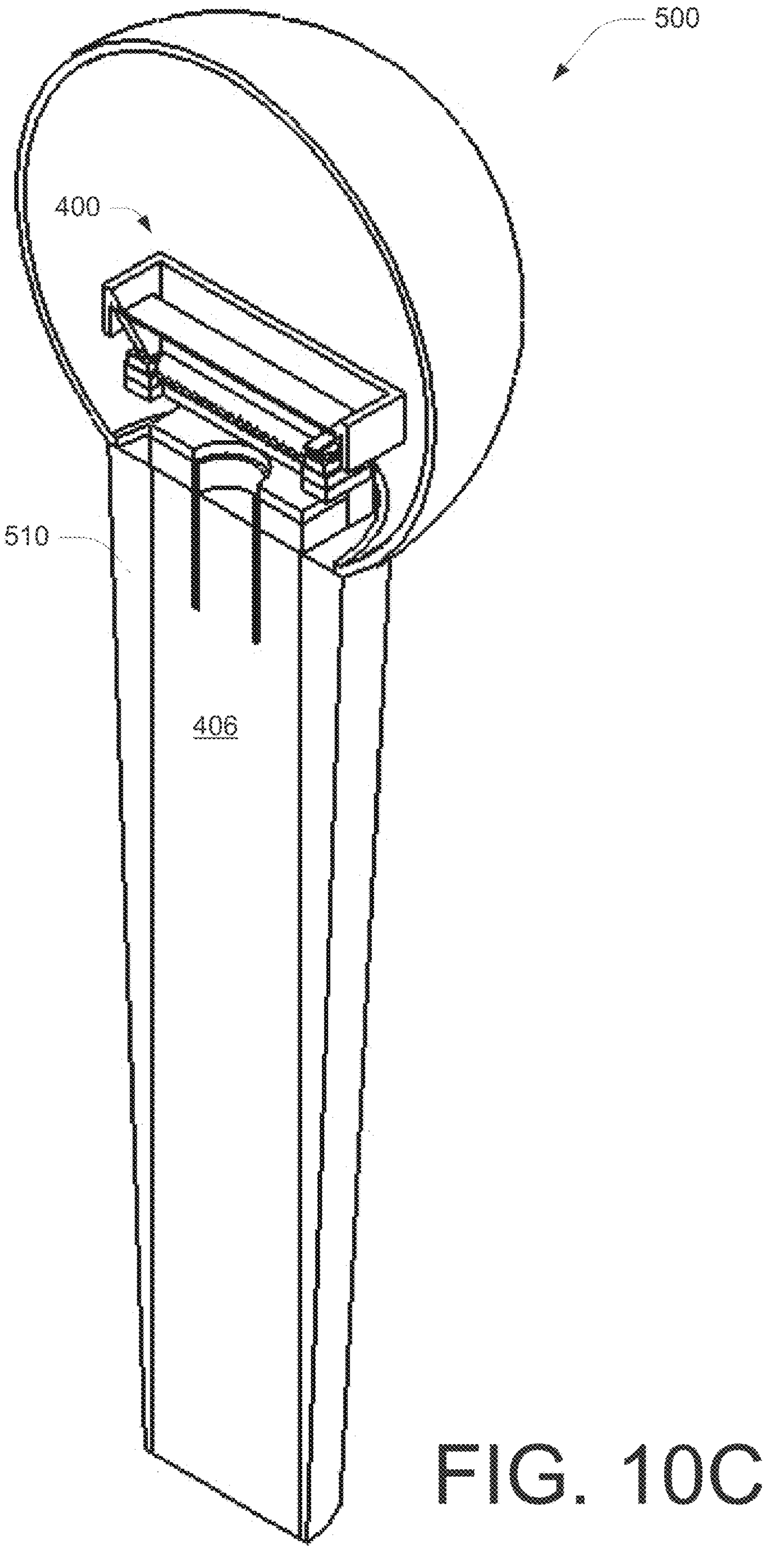
FIG. 10C shows a perspective view of a cross section of the backwave chamber of FIG. 10A in accordance with an embodiment of the invention.
Figure 10D:
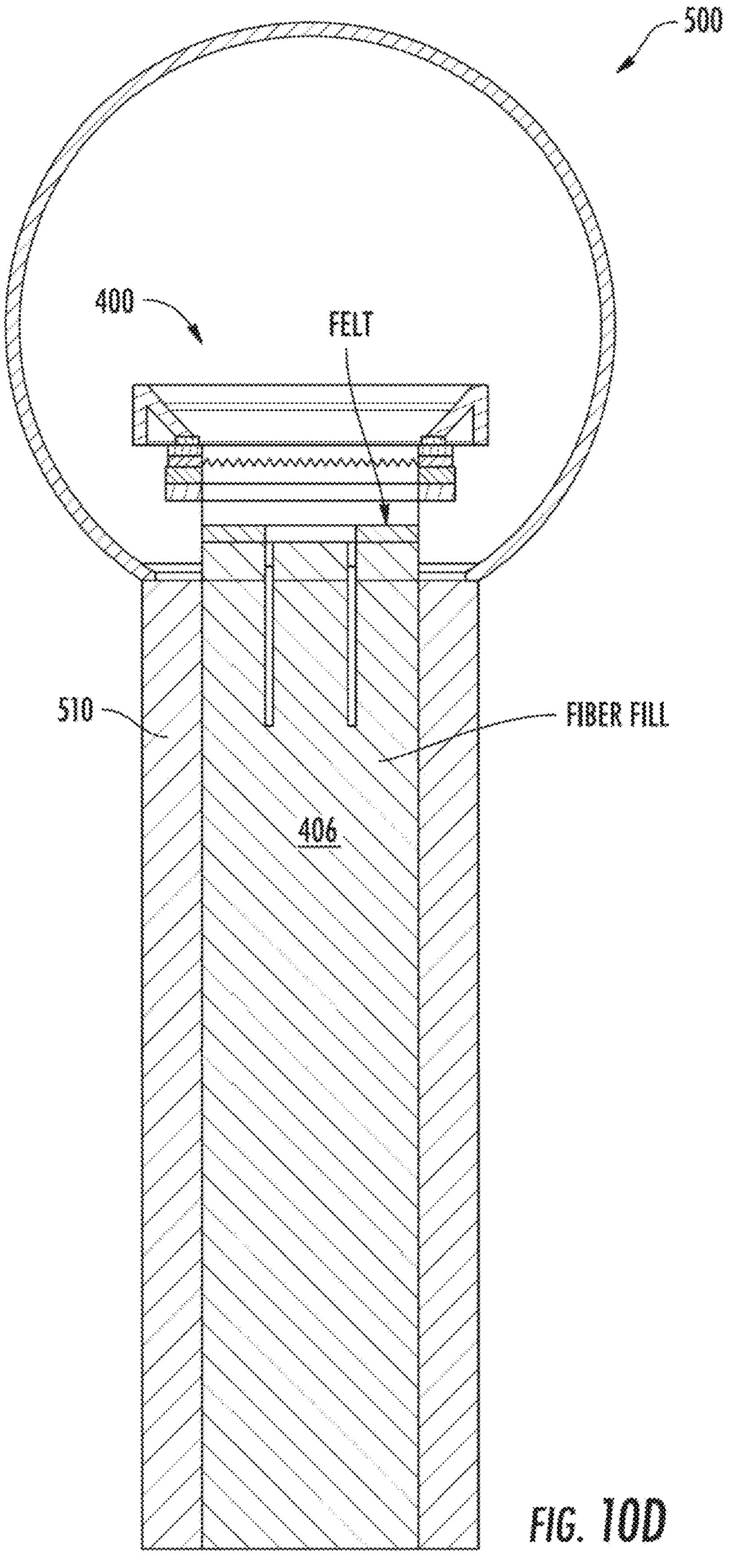
FIG. 10D shows a cross section of the backwave chamber of FIG. 10A in accordance with an embodiment of the invention.

A secondary chamber (406) is illustrated in FIG. 10A, which depicts a cross section of the microphone motor (400) of a microphone (500). FIG. 10B discloses a perspective view of the microphone (500) depicted in FIG. 10A. Additionally, FIGS. 10C and 10D show additional views of the microphone (500). As shown in FIG. 10A, the secondary chamber (406) is larger than the primary chamber (404) in a preferred embodiment of the invention. In one embodiment of the invention, the secondary chamber (406) is part of the microphone body for the microphone (500). As will be appreciated in one of ordinary skill in the art, although the secondary chamber (406) is depicted as cylindrical in FIGS. 10A-10D, the secondary chamber (406) may have any appropriate shapes in other embodiments of the invention.

In the embodiment of the invention as shown in FIG. 10A, a housing (510) of the microphone (500) encloses the secondary chamber (406). In one embodiment of the invention, the secondary chamber (406) is filled with a sound-absorbing material. The sound-absorbing material could be polyester fiber, polyethylene terephthalate (PET) fiber, foam, wool, fiberglass, nylon fiber, other sound absorbing materials, or a combination thereof. In one embodiment of the invention, the density of the sound-absorbing material in the secondary chamber (406) is greater than that of the sound-absorbing material in the primary chamber (404 of FIG. 9A~9B).

In a preferred embodiment of the invention, a large and sound-dampening backwave chamber absorbs and dissipates the acoustic pressure of the sound waves and prevents the sound waves from being reflected to the backside of the ribbon, which could cause an undesirable phase-canceling or doubling effect. Such phase canceling and/or doubling effects can generate audible resonance peaks at mid-range frequencies. As will also be appreciated by one of ordinary skill in the art, cardiod ribbon microphones typically have a poor low-frequency response caused by sound waves on the backside of the ribbon as the backside of the ribbon is 180 degrees out-of-phase with the front side, thereby causing phase cancellation of low-frequencies. By reducing both doubling effects and phase cancellations, the novel backwave chamber of the present invention reduces or eliminates mid-range frequency peaks while facilitating low-frequency responses. Therefore, a frequency response curve of the microphone (e.g. 500) utilizing the microphone motor (400), in accordance with an embodiment of the invention, is improved for the low frequency range and is flatter over the entire frequency bandwidth, compared to conventional ribbon microphones.

Furthermore, the ribbon microphone (e.g. 500) of the present invention using the microphone motor (400) can be used effectively for low frequency sound sources, such as bass drums and vocalist's lips pressed against the ribbon microphone (e.g. 500). In general, convention ribbon microphone designs were undesirable for low frequency sound sources due to the fragile nature of the ribbon inside a ribbon microphone. The extreme sound pressure associated with low frequency sounds, such as that from bass drums, loud amplifiers, plosive blasts, or even from slamming the lid on a microphone case, can stretch and/or distort a ribbon, thereby destroying the microphone. The large and sound-dampening backwave chamber including a primary chamber (e.g. 404) and a secondary chamber (e.g. 406) significantly reduces sound pressure on the ribbon. Furthermore, the blast filter comprising a baffle (e.g. 402) and a filter (e.g. 416) can also protect a ribbon (e.g. 211) from damage due to high-pressure sound waves. Therefore, the ribbon microphone (e.g. 500) comprising the novel microphone motor (e.g. 400) of the present invention can be used effectively in low frequency sound reproduction, recording, and high-pressure sound applications (e.g. kick drums) without damaging the ribbon (e.g. 211).

Figure 11A:
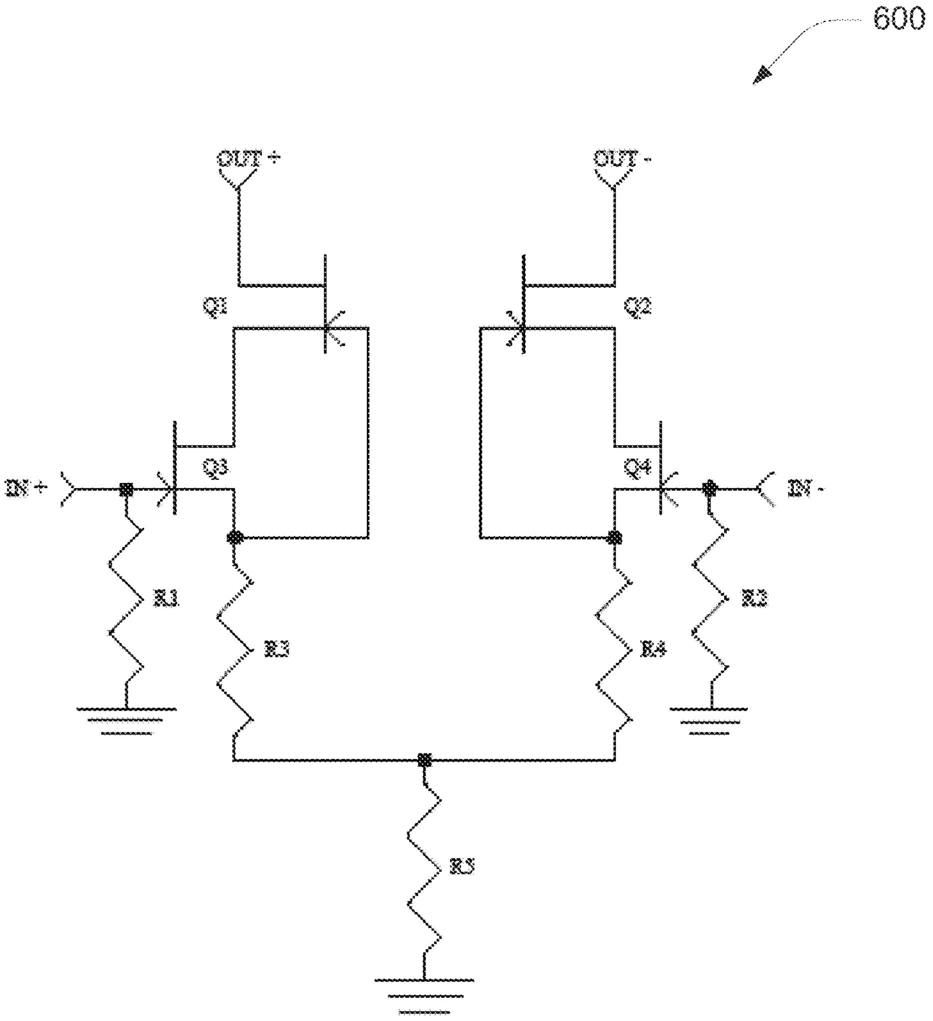
FIG. 11A shows a schematic of an embodiment of a phantom-powered differential cascode FET preamplifier gain circuit, in accordance with an embodiment of the invention.

Furthermore, the ribbon microphone (e.g. 500) embodying the present invention may further include a unique, phantom-powered differential cascode JFET (Junction Field Effect Transistor) preamplifier gain circuit. JFET is one type of a field effect transistor (FET), and other FET types may also be utilized for preamplifier signal gain. In general, conventional microphones do not incorporate phantom-powered differential cascodes. The phantom-powered differential cascodes disclosed in the present invention is novel and unique. Phantom power is a way of distributing DC current to provide power to a microphone. FIG. 11A illustrates a schematic of a novel phantom-powered differential cascode FET preamplifier gain circuit in accordance with a preferred embodiment of the invention.

In a preferred embodiment of the invention, a first FET (Q3) with its gate terminal operatively connected to a positive signal input terminal (IN+) is also operatively connected to a second FET (Q1) in differential cascode, wherein the second FET (Q1) has a positive signal output terminal (OUT+) for the phantom-powered FET preamplifier gain circuit (600). Likewise, a third FET (Q4) with its gate terminal operatively connected to a negative signal input terminal (IN−) is also operatively connected to a fourth FET (Q2) in differential cascode, wherein the fourth FET (Q2) has a negative signal output terminal (OUT−) for the phantom-powered FET preamplifier gain circuit (600).

Figure 11B:
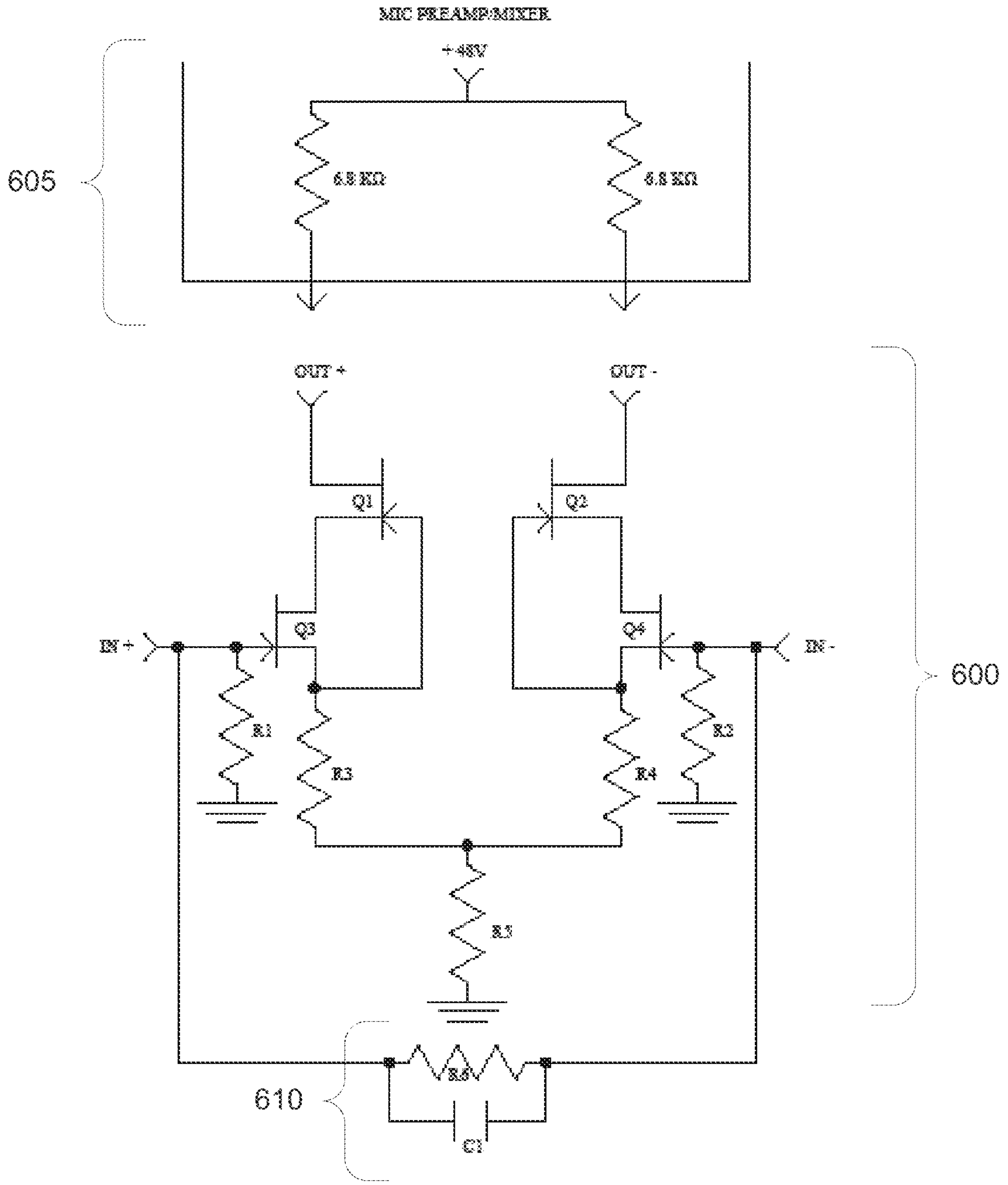
FIG. 11B shows a schematic of a phantom-powered circuit of FIG. 11A further comprising a resistor-capacitor network, in accordance with an embodiment of the invention.

Furthermore, in the preferred embodiment of the invention, one or more resistors (R3, R4, R5) are operatively connected to the first FET (Q3) and the third FET (Q4) within the phantom-powered FET preamplifier gain circuit (600). In addition, as shown in FIG. 11B, one or more gain-setting feed resistors (e.g. 6.8 kilo-ohm resistors in 605 of FIG. 11B) supplying power to the phantom-powered FET preamplifier gain circuit (600) are operatively connected to the positive signal output terminal or the negative signal output terminal of the phantom-powered FET preamplifier gain circuit. In the preferred embodiment of the invention, the one or more gain-setting feed resistors are part of a preamplifier (605) operatively connected to the phantom-powered FET preamplifier gain circuit (600).

This phantom-powered FET circuit boosts a signal level of a passive microphone by approximately +20 dB with high-fidelity, when it is placed between a microphone output transformer and a phantom-powered microphone input device.

As shown in FIG. 11B, the FET preamplifier gain circuit (600) uses phantom-power supply feed resistors (e.g. 6.8 kilo-ohm resistors in the preamplifier (605)) in a phantom power supply, wherein the feed resistors are external to the FET preamplifier gain circuit (600), provide power, and serve as gain-setters to the FET preamplifier gain circuit (600). As will be appreciated by one of ordinary skill in the art, the novel configuration of using the feed resistors as gain-setters in the phantom power supply outside of the FET preamplifier gain circuit (600) enables simplification of the FET preamplifier gain circuit (600) design, while minimizing potential signal distortions which could have been introduced in conventional FET preamplifier gain circuits. The feed resistors also influence the final amount of signal boost or gain.

Furthermore, because the FET preamplifier gain circuit (600) also utilizes one or more feed resistors remotely located in another device as gain-setting resistors, the FET preamplifier gain circuit (600) does not have to use coupling transistors, resistors, or capacitors in its direct signal path. Furthermore, the FET preamplifier gain circuit (600) does not have to use an output transformer. As will be appreciated by one of ordinary skill in the art, the FET preamplifier gain circuit (600) is much simpler than typical phantom power circuits and has a reduced parts count, making the FET preamplifier gain circuit (600) more cost effective to manufacture. Additionally, by providing a direct coupled signal path in the FET preamplifier gain circuit (600), any potential distortion caused by coupling transformers or coupling capacitors can be eliminated from a preamp design in the present invention.

In a preferred embodiment of the invention, example component values may be "Q1+Q2=2SK117" and "Q3+Q4=2SK170" for FET's, and "R1+R2=680 kilo-ohms", "R3+R4=22 ohms", and "R5=47 ohms" for resisters. In another embodiment of the invention, these component values may be different from the preferred embodiment of the invention.

Furthermore, as will be appreciated by one of ordinary skill in the art, the FET preamplifier gain circuit (600) results in a significantly improved sound quality over conventional active microphone designs. By eliminating or reducing resistors in its direct signal path and no coupling transformers and coupling capacitors, the sound distortion common in all other phantom powered active circuits is largely removed. The production cost of the FET preamplifier gain circuit (600) may be lower than conventional preamplifier gain circuits, while the sound quality is greatly improved by limiting the number of components in the signal path.

In one embodiment of the invention as shown in FIG. 11B, the FET preamplifier gain circuit (600) further includes a resistor-capacitor (RC) network (610) comprising a resistor (R6) and a capacitor (C1). In this embodiment of the FET preamplifier gain circuit (600), the RC network (610) enables the FET preamplifier gain circuit (600) to be used as an external box powered by a +48V power supply in a microphone input device without radio frequency interference associated with a cable length. In some embodiments of the invention, the FET preamplifier gain circuit (600) is used in conjunction with a preamplifier (605), resulting in an approximately 20 dB of ultra-transparent high-fidelity gain.

In an embodiment of the invention as shown in FIG. 11B, R6 provides a low impedance load from the positive input terminal to the negative input terminal, thereby reducing the potential for electromagnetic and radio frequency (RF) interferences. This is particularly significant when the cable length between the input terminals and the microphone transformer is longer than a few inches.

Moreover, C1 is an RF shunt capacitor in FIG. 11B, wherein the RF shunt capacitor is able to suppress RF interferences when the wiring for a transformer-to-circuit input is long or poorly shielded by acting as an electrical dead short at radio frequencies. As will be appreciated by one of ordinary skill in the art, an electrical dead short is an electrical circuit that has zero resistance. As shown in FIG. 11B, example component values in this embodiment of the invention may be "Q1+Q2=2SK117" and "Q3+Q4=2SK170" for FET's, "R1+R2=680 kilo-ohms", "R3+R4=22 ohms", "R5=47 ohms", "R6=3 kilo-ohms" for resisters, and "C1=100 pF" for the RF shunt capacitor. In another embodiment of the invention, these component values may be different from the this embodiment of the invention.

Figure 11C:
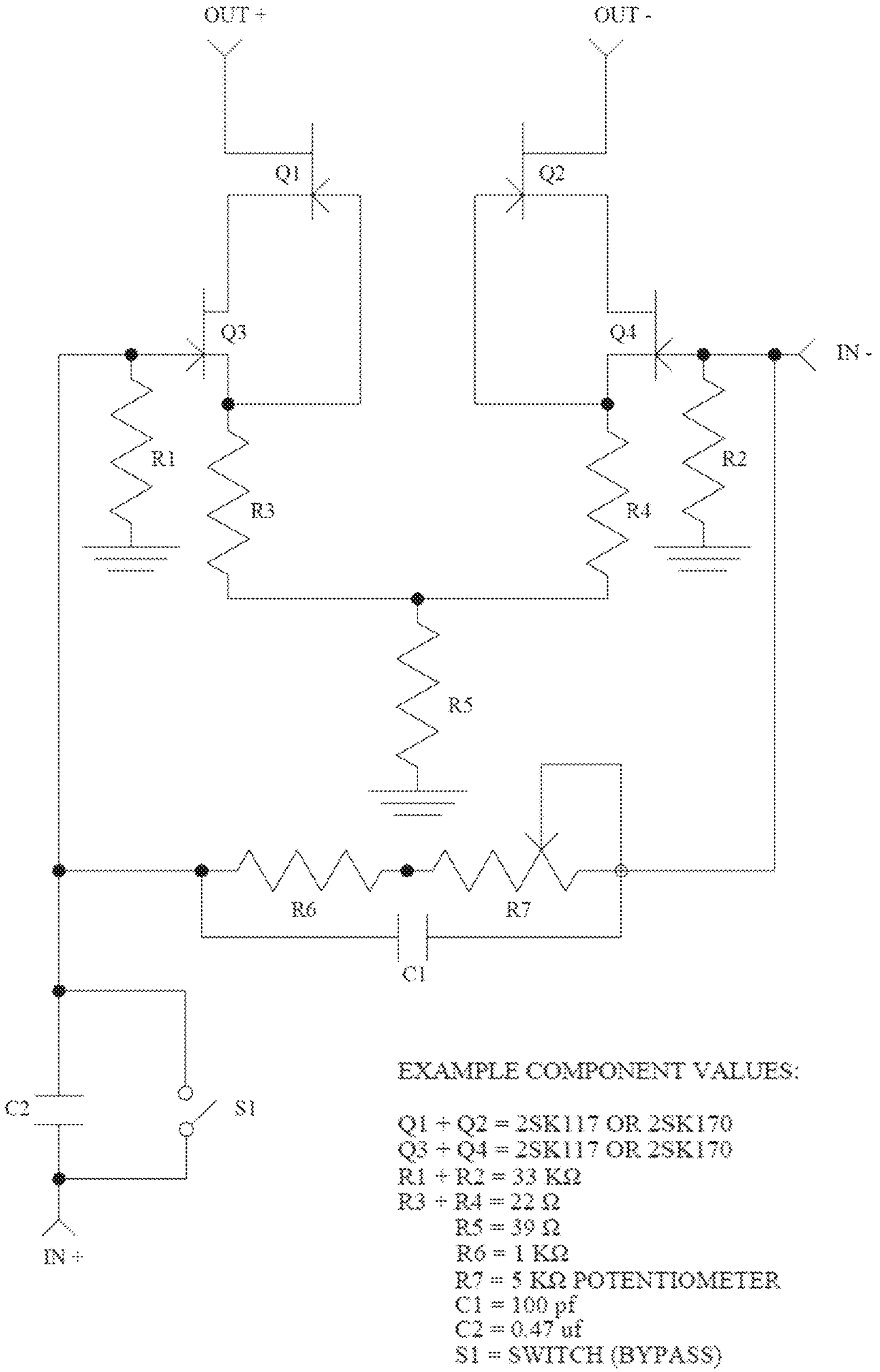
FIG. 11C shows a schematic of a FET preamplifier gain circuit which includes a series capacitor, a bypass switch, and a potentiometer to an input circuitry, in accordance with an embodiment of the invention.

Furthermore, FIG. 11C shows a variation of the FET preamplifier gain circuit, which further includes a series capacitor (C2), a bypass switch (S1), and a potentiometer (R7) to the input circuitry. The capacitor (C2) acts as a high pass filter, which is bypassable via the switch (S1). The potentiometer (R7) varies the input load resistance, which both acts as a variable high pass control when the capacitor is not bypassed, and also as a variable load to the microphone that allows the user to vary the microphone sound according to the characteristics of the microphone's output transformer. An embodiment of the invention without the potentiometer may comprise a fixed high pass filter variation of the FET preamplifier gain circuit (e.g. 600).

As shown in FIG. 11C, example component values in this embodiment of the invention may be "Q1+Q2=2SK117 or 2SK170" and "Q3+Q4=2SK117 OR 2SK170" for FET's, "R1+R2=33 kilo-ohms", "R3+R4=22 ohms", "R5=39 ohms", "R6=1 kilo-ohms" for resisters, "R7=5 kilo-ohms" for the potentiometer, and "C1=100 pF" and "C2=0.47 pF" for the capacitors. In another embodiment of the invention, these component values may be different from this embodiment of the invention.

Figure 11D:
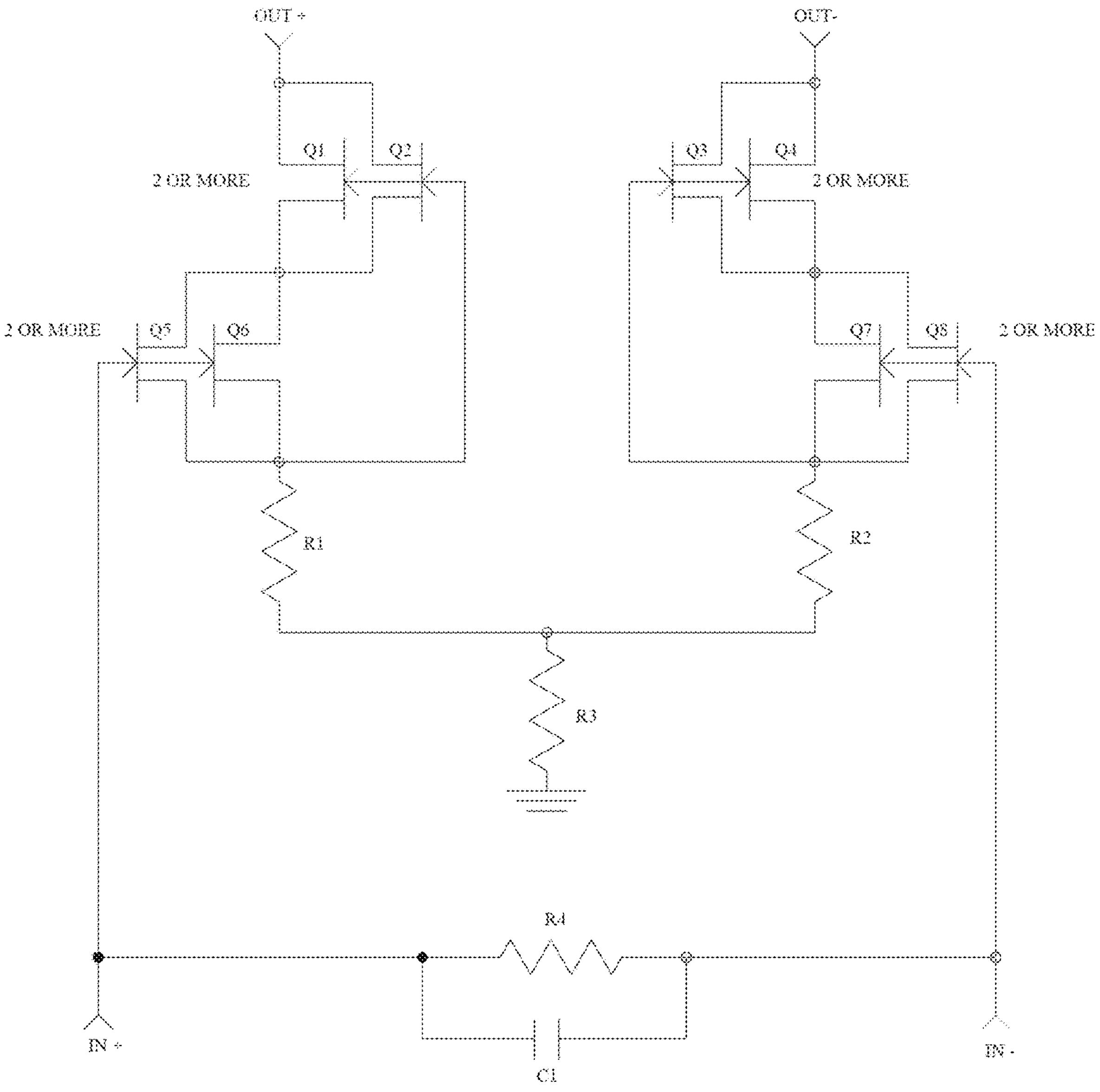
FIG. 11D shows a schematic of a FET preamplifier gain circuit which includes two or more parallel-connected FET devices in each FET device position, in accordance with an embodiment of the invention.

Moreover, FIG. 11D shows a variation of the FET preamplifier gain circuit with two or more parallel-connected FET devices in each FET device position (e.g. Q5, Q6 in parallel, Q7, Q8 in parallel, and etc.). This allows for additional gain and/or lower noise, which can be achieved with two or more parallel-connected devices in either upper or lower pairs in the differential cascode, or as shown, with parallel devices in both upper and lower pairs in this variation of the FET preamplifier gain circuit. In some embodiments of the invention, parallel-connected FET pairs (e.g. Q5 and Q6 as a first parallel-connected pair and Q7 and Q8 as a second parallel-connected pair in FIG. 11D) may be connected to signal output terminals directly without cascode connections to other (e.g. upper or lower) FET pairs. Regardless of the number of FET devices used in each position, the fundamental design and function of the circuit remains the same. In fact, with alterations to accommodate the nature of devices chosen, this same circuit can be built with MOSFET devices, bipolar transistors, and even vacuum tubes with added power supply for filaments, and have the same fundamental design and function, characterized by a phantom-powered, differential, parallel-connected, and/or folded cascode microphone pre-preamplifier circuit in at least one embodiment of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A phantom-powered transistor preamplifier gain circuit for a microphone or a musical instrument, the phantom-powered transistor preamplifier gain circuit comprising:

a first transistor and a second transistor with their gate terminals coupled to a first signal input terminal, which is configured to receive at least one sound source signal, and wherein the first transistor and the second transistor are connected to each other in parallel and further coupled to a first signal output terminal powered by an external phantom power supply; and a third transistor and a fourth transistor with their gate terminals coupled to a second signal input terminal, which is configured to receive at least one sound source signal, and wherein the third transistor and the fourth transistor are connected to each other in parallel and further coupled to a second signal output terminal powered by the external phantom power supply.

2. The phantom-powered transistor preamplifier gain circuit of claim 1, wherein the at least one sound source signal is a microphone signal from the microphone or a sound signal from the musical instrument.

3. The phantom-powered transistor preamplifier gain circuit of claim 1, further comprising one or more resistors coupled to the first transistor and the third transistor within the phantom-powered transistor preamplifier gain circuit.

4. The phantom-powered transistor preamplifier gain circuit of claim 1, further comprising one or more gain-setting feed resistors, wherein the one or more gain-setting feed resistors are coupled to the first signal output terminal or the second signal output terminal of the phantom-powered transistor preamplifier gain circuit.

5. The phantom-powered transistor preamplifier gain circuit of claim 1, further comprising an RC network including an additional resistor and an RF shunt capacitor, wherein the RC network enables the phantom-powered transistor preamplifier gain circuit to be used as an external box powered by the external phantom power supply to the microphone without radio frequency interference associated with a cable length.

6. The phantom-powered transistor preamplifier gain circuit of claim 1, further comprising a series capacitor, a bypass switch, and a potentiometer to the first signal input terminal and the second signal input terminal as a bypassable high-pass filter with a variable input load.

7. The phantom-powered transistor preamplifier gain circuit of claim 1, wherein an additional transistor is in parallel to at least one of the first transistor, the second transistor, the third transistor, and the fourth transistor.

8. The phantom-powered transistor preamplifier gain circuit of claim 4, wherein the one or more gain-setting feed resistors also provide electrical power to the phantom-powered transistor preamplifier gain circuit.

9. The phantom-powered transistor preamplifier gain circuit of claim 1, wherein the microphone is a ribbon microphone, a condenser microphone, or a dynamic microphone.

10. The phantom-powered transistor preamplifier gain circuit of claim 1, wherein the first signal input terminal is a positive input terminal and the first signal output terminal is a negative output terminal.

11. The phantom-powered transistor preamplifier gain circuit of claim 1, wherein the second signal input terminal is a negative input terminal and the second signal output terminal is a positive output terminal.

12. The phantom-powered transistor preamplifier gain circuit of claim 1, wherein the first signal input terminal is a positive input terminal and the first signal output terminal is a positive output terminal.

13. The phantom-powered transistor preamplifier gain circuit of claim 1, wherein the second signal input terminal is a negative input terminal and the second signal output terminal is a negative output terminal.

* * * * *